(12) United States Patent
Holtappels et al.

(10) Patent No.: US 9,450,220 B2
(45) Date of Patent: Sep. 20, 2016

(54) ELECTRIC ENERGY STORAGE AND SUPPLY SYSTEM

(71) Applicant: TANKTWO OY, Askola (FI)

(72) Inventors: Bert Holtappels, Helsinki (FI); Juha Tuomola, Vantaa (FI); Timo Rissanen, Helsinki (FI)

(73) Assignee: TANKTWO OY, Askola (FI)

( * ) Notice: Subject to any disclaimer, the term of this patent is extended or adjusted under 35 U.S.C. 154(b) by 0 days.

(21) Appl. No.: 14/648,028

(22) PCT Filed: Sep. 10, 2014

(86) PCT No.: PCT/EP2014/069304
§ 371 (c)(1),
(2) Date: May 28, 2015

(87) PCT Pub. No.: WO2015/036438
PCT Pub. Date: Mar. 19, 2015

(65) Prior Publication Data
US 2016/0020445 A1  Jan. 21, 2016

(30) Foreign Application Priority Data
Sep. 13, 2013  (GB) .................................. 1316293.8

(51) Int. Cl.
*H01M 2/10* (2006.01)
*B60L 3/12* (2006.01)
(Continued)

(52) U.S. Cl.
CPC .......... *H01M 2/1083* (2013.01); *B60L 3/0046* (2013.01); *B60L 3/12* (2013.01);
(Continued)

(58) Field of Classification Search
None
See application file for complete search history.

(56) References Cited

U.S. PATENT DOCUMENTS

| 8,054,049 B1 | 11/2011 | Michaelis |
| 2008/0169787 A1 | 7/2008 | Hsieh |

(Continued)

FOREIGN PATENT DOCUMENTS

| DE | 10 2006 047 654 A1 | 10/2008 |
| DE | 10 2010 018 698 A1 | 11/2011 |

(Continued)

OTHER PUBLICATIONS

International Search Report, dated Dec. 2, 2014, and Written Opinion issued in International Application No. PCT/EP2014/069304.

(Continued)

*Primary Examiner* — Sarah A Slifka
(74) *Attorney, Agent, or Firm* — Saul Ewing LLP

(57) ABSTRACT

An electric energy storage and supply system comprising a tank capable of accommodating a plurality of battery units where each battery unit comprises an electric energy reservoir having positive and negative voltage supply terminals, three or more electric contact pads on an outer surface of the battery unit, and a dynamically configurable connection unit for electrically connecting each of said positive and negative voltage supply terminals to any one or more of said electric contact pads, wherein electric energy can be drawn from the electric energy reservoir via selectively different combinations of electric contact pads. The system further comprises at least two inwardly facing tank contact pads provided on the inside of the tank for contacting electric contact pads of neighboring battery units and for delivering electrical energy from the system towards an external load.

17 Claims, 17 Drawing Sheets

(51) Int. Cl.
   B60L 3/00      (2006.01)
   B60L 7/12      (2006.01)
   B60L 11/00     (2006.01)
   B60L 11/16     (2006.01)
   B60L 11/18     (2006.01)
   H01M 2/20      (2006.01)
   H01M 2/30      (2006.01)
   H01M 2/34      (2006.01)
   H01M 10/42     (2006.01)
   H01M 10/44     (2006.01)
   H01M 10/46     (2006.01)
   H02J 7/00      (2006.01)
   B60K 1/04      (2006.01)
   H01M 10/6563   (2014.01)
   H01M 10/656    (2014.01)

(52) U.S. Cl.
   CPC ............... *B60L 7/12* (2013.01); *B60L 11/005* (2013.01); *B60L 11/16* (2013.01); *B60L 11/1822* (2013.01); *B60L 11/1853* (2013.01); *B60L 11/1862* (2013.01); *B60L 11/1864* (2013.01); *B60L 11/1874* (2013.01); *B60L 11/1879* (2013.01); *B60L 11/1887* (2013.01); *H01M 2/206* (2013.01); *H01M 2/305* (2013.01); *H01M 2/342* (2013.01); *H01M 10/4207* (2013.01); *H01M 10/4221* (2013.01); *H01M 10/4257* (2013.01); *H01M 10/441* (2013.01); *H01M 10/46* (2013.01); *H02J 7/007* (2013.01); *H02J 7/0013* (2013.01); *B60K 1/04* (2013.01); *B60K 2001/0455* (2013.01); *B60L 2200/44* (2013.01); *B60L 2240/545* (2013.01); *B60L 2240/547* (2013.01); *B60L 2240/549* (2013.01); *B60L 2260/52* (2013.01); *B60L 2260/54* (2013.01); *B60L 2270/145* (2013.01); *H01M 10/656* (2015.04); *H01M 10/6563* (2015.04); *H01M 2010/4271* (2013.01); *H01M 2010/4278* (2013.01); *H01M 2220/20* (2013.01); *Y02T 10/7022* (2013.01); *Y02T 10/7044* (2013.01); *Y02T 10/7061* (2013.01); *Y02T 10/7072* (2013.01); *Y02T 90/124* (2013.01); *Y02T 90/14* (2013.01); *Y02T 90/34* (2013.01)

(56) References Cited

U.S. PATENT DOCUMENTS

| | | |
|---|---|---|
| 2010/0190052 A1 | 7/2010  | Rajani et al. |
| 2012/0094162 A1 | 4/2012  | Gyenes |
| 2012/0326665 A1 | 12/2012 | Yin et al. |
| 2014/0356670 A1 | 12/2014 | Haug et al. |
| 2014/0360010 A1 | 12/2014 | Haug et al. |

FOREIGN PATENT DOCUMENTS

| | | |
|---|---|---|
| GB | 2353151 A      | 2/2001 |
| GB | 2513648 A      | 11/2014 |
| JP | 2011229324     | 11/2011 |
| WO | 2011/134463 A2 | 11/2011 |

OTHER PUBLICATIONS

Combined Search and Examination Report, dated Mar. 13, 2014, issued in corresponding GB Application No. GB1316293.8.
Follow-up correspondence issued in corresponding GB Application No. GB131629308.

ELECTRIC ENERGY STORAGE AND SUPPLY SYSTEM

CROSS REFERENCE TO RELATED APPLICATIONS

This application claims the priority of PCT/EP2014/069304, filed on Sep. 10, 2014, which claims priority to Great Britain Application No. 1316293.8, filed Sep. 13, 2013, the entire contents of each of which is fully incorporated herein by reference.

FIELD OF THE INVENTION

The invention relates to an electric energy storage and supply system for storing electrical energy, and more particularly to a battery tank for storing battery units each of which stores electrical power.

The invention can be used in particular in connection with intelligent power supply systems for electric vehicles, but also in the fields of mobile electrical appliances, energy management, energy trading, routing and communication, to mention some examples.

BACKGROUND OF THE INVENTION

Electric Vehicles (EVs) are growing in popularity for reasons such as a different driving experience, higher performance, better reliability and lower maintenance, lower operational cost, and the potential to decrease the environmental impact of transportation. Electricity is used exclusively to propel the vehicle, or can be used to assist other methods such as internal combustion engines (ICEs).

The main types of the EVs are battery electric vehicles (BEV), plug-in hybrid electric vehicles (PHEV) and hybrid electric vehicles (HEV). EVs use an electric motor for propulsion. Electric energy is stored in batteries using, e.g. lithium-ion technology or any other form of battery chemistry. Other forms of energy storage are applicable too, such as supercapacitors or fuel cells. The HEV and the PHEV combine a conventional combustion engine with an electric drive system. HEVs use typically regenerative breaking to charge the batteries. PHEV contains rechargeable batteries that can be fully charged by connecting a plug to an external electric power source. BEVs are all electric vehicle without an internal combustion engine. The BEV and the PHEV also enables a user to choose alternative energy for charging the batteries by choosing an external power source which is using, for example, solar or wind power to produce electricity.

A common problem with current PHEVs and BEVs using rechargeable batteries is the long charging time. In a typical case charging requires hours and there are also a lot of city center apartments without any plug-in capabilities for vehicles. There are some fast charging stations but also at these charging times are much longer compared with cars using combustion engines which can be quickly "charged" in fuel stations. Fast charging also means that batteries tend to wear out faster. Also energy density is not so high which means bigger and heavier batteries. Power losses are also higher with fast charging. Also charging an 80 kWh battery in for example 30 minutes sets such power requirements that it is not possible typically at a residential home.

Another problem is that fast charging sets extra requirements for an electric infrastructure which is already stretched to the limit in many countries. In many industrialized nations, spare capacity in the order of magnitude of 50% or more is available and predictable. However, these are also times of lowest human and economic activity, which would be when fast charging is of no use. Although a typical user would charge at home during night time, a user could still prefer sourcing his energy from a commercial station which might offer lower prices than available to residential users. Other options include positive discrimination of renewable energies. For these cases current charging times are not what users are expecting.

There are several different proposals for changing the batteries for BEVs to overcome the problem described above. Typically rechargeable cells are grouped as modules and each module consists of a plurality of cells. These modules are monitored and controlled as one entity. If needed, a module can be changed in a service station to another module containing charged cells to supply quickly energy for BEV. One issue is that the available size for the battery varies a lot of depending on the use case and it might not be rectangular: one module doesn't fit well to all the use cases. It is possible to have modules with different sizes and form depending on the use case, meaning service stations would have to stock different modules which do not make sense financially.

Examples of modular energy storage systems of the kind described above are disclosed in U.S. Pat. No. 7,948,207 and US 2012/094162. There are also many multicell battery designs available having the possibility to connect on and off individual cells of the battery. Examples of these kinds of designs are disclosed in CN 202535104, CN 102832646, U.S. Pat. Nos. 8,330,420 and 7,075,194.

There are also several proposals as to how to monitor individual cells and, based on the characteristics of individual cells, to configure systems dynamically. For example US 2010/0261043 proposes a system for a dynamically reconfigurable battery framework for a large-scale battery system. This solves a problem as to how individual cells can be monitored and controlled but this system do not fit if the requirement is to replace hundreds of the depleted cells quickly in service station to supply electric energy for BEVs, since the cells are located in a certain way in a battery pack. Other control, failure-detection, reconfiguration, bypass and lifecycle management systems for batteries are disclosed for example in US 2005/242776, US 2006/192529, EP 2582009 and U.S. Pat. No. 8,084,994. These systems suffer at least partly from the same disadvantages.

Thus, there is a need for improved solutions for quickly supplying electric energy to electric vehicles and other power-intensive battery-operated devices.

SUMMARY OF THE INVENTION

It is an aim of the invention to solve at least some of the above mentioned problems and to provide an electrical tank whose electric energy capacity may be quickly regained once consumed.

The solution proposed here by way of example is based on the idea of utilizing small battery units, which can be placed in contact with each other and configured afterwards to form a larger power source. Each battery unit comprises at least one two-pole electric energy reservoir, typically an electrochemical cell, having electric terminals corresponding to its poles. On the surface of the unit, there are contact areas, the number of which is larger than the number of poles of the energy reservoir. In addition, there are reprogrammable means for connecting the contact areas to the terminals in different configurations such that the electrical energy of the energy reservoir can be led out of the battery unit in a plurality of ways, depending on the programming of the unit.

A plurality of battery units are placed inside a specially equipped container, herein called a "tank" as being analogous to a fuel tank, to form a larger power source. The tank is a container structure capable of holding a plurality of battery units and comprising means for making electrical contact with the contact areas of at least some of the battery units held therein. In the tank, the battery units come close to each other such that at least some of their contact areas are in touch with contact areas of other battery units and/or the contacting means of the tank. Once the battery units are in place, they are programmed to change their internal connecting configuration such that a power delivery pathway is formed through a plurality of battery units and further out of the tank. Programming can be achieved in a variety of ways, which are described in more detail later. In a typical embodiment, the programming is a multi-step process controlled by a control unit functionally connected to the tank.

The capability to internally reconfigure each battery unit allows for loosening the positioning requirements of the battery units. In one principal embodiment of the invention, the battery units are placed inside the tank in arbitrary order and orientation. This is achieved by suitable design of the battery units and the tank. More specifically, this requires that, the contact area pattern on the surface of the battery units is such that each battery unit, or at least a majority of the battery units, is in touch with at least two other battery units or at least one another battery unit and a contact surface of the tank via two different contact areas on its surface, when the battery units are in the tank under physical conditions (e.g. gravity, pressure) prevailing in the tank. Consequently, the battery units can be conducted to the tank quickly in a variety of ways without the need to position individual battery units inside the tank, for example by pouring or with a gas flow. Still, an operational power source is obtained.

In the preferred case, one battery unit includes at least one electrochemical cell or any other energy reservoir like high capacitance capacitor, a housing (shell frame), at least three contact areas on its outer surface and necessary electronics for configuration of the contact areas of the battery unit, and optionally monitoring one or more electrical or physical parameters of the battery unit. By suitable configuration, the battery unit can be charged and discharged via any two contact areas of the battery unit.

Embodiments presented here may provide considerable advantages. The battery units described herein can be used for forming an energy source for EVs or other systems that use electrical power. Although an individual battery unit can be used as such as a source of electricity, in a typical case, several battery units work together inside an electric tank to provide a larger source of power, as briefly described above. These battery units can be partially or totally removed from the tank at maintenance shops, or at a service station, recharged outside of the vehicle, and put pack into the same or another EV after charging. After removing the battery units, the user can instantly fill the tank with charged battery units at a filling station. Thus, the invention allows tanking up of EVs in a relatively similar manner as refueling of vehicles using liquid- or gas-form gas fuel. The most notable benefit of this is the speed. Of course, there may also be provided the possibility to charge the battery units inside the EV, such as in conventional plug-in EVs (BEVs and PHEVs).

Embodiments of the invention may also provide other technical, economical and environmental advantages. Batteries that are charged more rapidly, in a less controlled fashion, or depleted more deeply, tend to fail and wear out quicker in the field than those which are only gently used and managed carefully. Since the present battery units can be removed from the EV and replaced with recharged ones, they can be gently recharged outside the EV, usually without hurry, in a controlled environment, under strict management of parameters which maximize performance, maximize their useful life, or optimize any other parameter as required by the business case. Recharging at large central service stations is efficient, since power transmission losses can be kept smaller than when delivering the charging power to individual residences, for example, due to shorter transmission distances, higher transmission voltages and better-quality power grids.

The invention is generic in nature. It can be of great benefit also to other devices and systems that need, or can benefit from, a source of electrical power. Examples include power tools, mobile medical stations, military deployment units, aircraft, construction machinery, warehouse logistics robots, and more.

According to a first aspect of the invention there is provided an electric energy storage and supply system comprising a plurality of battery units where each battery unit comprises an electric energy reservoir having positive and negative voltage supply terminals, three or more electric contact pads on an outer surface of the battery unit, and a dynamically configurable connection unit for electrically connecting each of said positive and negative voltage supply terminals to any one or more of said electric contact pads, wherein electric energy can be drawn from the electric energy reservoir via selectively different combinations of electric contact pads. The system further comprises a tank capable of accommodating the plurality of battery units. The system further comprises at least two inwardly facing tank contact pads provided on the inside of the tank for contacting electric contact pads of neighboring battery units and for delivering electrical energy from the system towards an external load, a tank loader for loading battery units into the tank such that electrical contact pads of adjacent battery units are or have a high probability of being in contact and the orientation and location of individual battery units within the tank is unknown a priori, and a tank unloader for unloading battery units from the tank.

According to one embodiment, one or both of the tank loader and tank unloader are pressure and/or gas flow aided.

According to one embodiment, the electric energy storage and supply system comprises a pressurizing unit for applying pressure to the loaded tank in order to immobilize the battery units.

According to one embodiment, the electric energy storage and supply system comprises a charging controller for recharging the loaded battery units.

According to one embodiment, the electric energy storage and supply system comprises a cooling unit for cooling the loaded battery units by circulating a cooling fluid within the loaded tank.

According to one embodiment, the electric energy storage and supply system comprises an agitation unit for agitating the tank in order to increase the packing density and/or stability of the loaded battery units.

According to one embodiment, the electric energy storage and supply system comprises a controller for identifying one or more available and/or optimal electrical energy supply paths between the or at least two tank contact pads via the battery units and for programming individual battery units to supply electrical energy via these paths. The controller may have an interface for receiving information on the state of battery units in the tank and may be configured to use the information to identify the optimal electrical energy supply paths. The interface may communicate with the battery units via the tank contact pads and the electric contact pads of the battery units. The controller may be configured to receive, via the interface, machine readable identification codes transmitted by battery units in the tank, and to use the codes as addresses for transmitting programing instructions to the units.

The controller may be configured to dynamically repeat the steps of identifying and programming in order to maintain optimal electrical energy supply paths. The controller may be configured to identify a plurality of optimal electrical energy supply paths such that each path passes through a different subset of battery units.

Where the tank comprises three or more tank contact pads, the controller may be configured to identify optimal electrical energy supply paths taking into account different available combinations of tank contact pads.

According to one embodiment, the electric energy storage and supply system comprises a power combiner for selecting and/or combining electric energy available from multiple different available and/or optimal electrical energy supply paths.

The tank contact pads may be arranged as one or more arrays of contact pads.

According to one embodiment, the tank loader is configured to assist pumping of battery units into the tank.

According to a further aspect of the invention, there is provided a vehicle comprising the electric energy storage and supply system according to the above aspect.

Considering further an exemplary battery unit, the number of contact areas is at least three, allowing current to be drawn from the battery unit along not only in different directions, but also along different routes. This greatly increases the programming possibilities of a tank filled with battery units.

The number of contact areas is not limited, but in typical embodiments 4 to 50, in particular 6 to 14 may be practical. Such battery units are particularly beneficial when it is desired that the battery units are randomly packed inside the tank to allow for sufficient configuration possibilities.

According to one embodiment, the contact areas cover more than 60%, in particular more than 70%, typically 75% to 95% of the outer surface of the housing. Contact area is limited by the needed clearance and creepage between the individual contacts. Contact area coverage should be maximized in order to ensure high probability of electrical contacting of each battery unit with another battery unit or contact surfaces of the tank.

According to one embodiment, the battery units are shaped such and the number and positioning of the contact areas is such that when the battery units are randomly packed, a majority of the contact areas can make a contact with only one another contact area of another similarly designed battery unit. This embodiment makes programming of the tank more robust and avoids undesired connections, which depending on the routes chosen, can be three-way contacts, or shorts. Although algorithms can take such conditions into account, they may reduce efficiency, load factor or other parameters. In one embodiment, the design is such that all contact areas can make a contact with only one another contact area of another battery unit. This is possible for various battery unit shapes by using a sufficiently high number of sufficiently small contact areas.

According to one embodiment the dynamically configurable connection unit is programmable to connect the contact areas to a common star point in a star pattern through resistors, preferably essentially equal resistors. This embodiment allows for convenient discovery of the battery units by the tank control system, as will be described later in more detail. The same resistors may help to measure the current flowing through each contact area by measuring a voltage over the corresponding resistors. Battery units of this kind are able to form a resistor network inside the electric tank, whereby the presence and contacts between the battery units can determined using a current fed through the network and communicating with the battery units to collect information on their contacting state based on the voltage measurement over the resistors.

According to one embodiment, the dynamically configurable connection unit is configured to connect at least two contact areas electrically together to form a current bypass route from at least one contact area to at least one other contact area. This greatly increases tank programming possibilities and allows for example of non-use of a particular battery unit for energy delivery. This may be desired in the case of low charge level of a battery unit or for efficiency reasons.

According to one embodiment, the battery unit comprises means for measuring current flowing through any of its contact areas. This feature is usable in the discovery process and allows also for monitoring of the battery unit during operation.

According to one embodiment, the dynamically configurable connection unit is adapted to disconnect any of the contact areas from other contact areas and/or to connect any of the contact areas to an internal ground potential of the battery unit. This embodiment provides e.g. additional safety.

According to one embodiment, the connecting means are programmable by electric programming signals sent and received through said contact areas. Typically, the programming signals are provided by a tank control unit via the contact surfaces of the tank and potentially via one or more other battery units.

According to one embodiment, the battery unit comprises means for sending and receiving wireless programming signals, preferably electromagnetic radio-frequency signals, for programming the connecting means. In this case, the tank control unit may be connected to a wireless transceiver.

According to one embodiment, the battery unit comprises means for sending and receiving wireless programming signals, where optical methods are used for communication between battery units, and between battery units and the tank control system. Optical methods include monochrome light, or a mix of light of various wavelengths, including infrared; and laser.

In addition to one or more of the above mentioned galvanic or wireless signal receiving means, the battery units may comprise galvanic or wireless signal transmitting means for communicating back to the control unit e.g. for discovery and monitoring purposes.

According to one embodiment, the battery unit comprises a memory unit, potentially built within a central microcontroller thereof, comprising a unique identification code and said connecting means are configured to utilize the identification code to determine whether a programming signal is intended to program the battery unit. The identification code or derivative thereof is typically sent to the tank control unit during the discovery process.

According to one embodiment, the battery unit comprises means for sensing which contact areas are in galvanic electric contact with contact areas of battery units of the same type. This is, however, not necessary since the control unit may deduce the contact information through other methods based on current flow measurements, for example, as will be described later in more detail.

According to one embodiment, the battery units have a shape and size, which facilitate random packing. It is preferred that they battery units also provide high random fill ratio in containers of near arbitrary shape and size.

According to one embodiment, the battery unit has the shape of an ellipsoid. In a preferred embodiment, the shape is defined by an ellipsoidal housing provided with the contact areas on outer surface thereof and contact pathways through the housing to electronics contained in the housing. Ellipsoidal form is beneficial in embodiments of the invention involving random packing of battery units, as it provides high random fill ratio and good immobilization of battery units in their container. According to one embodiment, the main axes of the ellipsoid have a mutual ratio of 1.0 to 1.4:1:0.7 to 1.0, preferably 1.2 to 1.3:1:0.75 to 0.85, for example about 1.25:1:0.8.

According to one embodiment, the shape of the battery units allows a plurality of similar battery units to be packed into a volume with a fill ratio of at least 50%, preferably at least 60%, most preferably at least 70%.

In typical embodiments, the largest dimension of the battery unit is less than 10 cm, for example 1 to 10 cm, in particular less than 5 cm, such as 1 to 5 cm. Such units are small enough to be convenient to handle and large enough to contain a significant amount of energy. However, also smaller and larger units are usable in special applications.

The electric energy reservoir may be an electrochemical cell or cell array or supercapacitor or supercapacitor array. Also a fuel cell or any other DC power source is possible.

In addition to withdrawing current from the energy reservoir through the contact areas the battery units, the electric energy reservoir is typically rechargeable via the same contact areas.

According to one embodiment, the connecting means comprise a switching unit capable of connecting each terminal of the energy reservoir to at least one of the contact areas of the battery unit and additionally making one, two or three of the following connections: i) interconnecting at least two other contact areas with each other to define a current bypass route, ii) connecting all or all remaining contact areas to a common star point through resistors in a star configuration (i.e. to connect the contact areas to an internal ground of the battery unit), and iii) disconnecting any other contact area from the terminals and from other contact areas. The possibility to do additional connections i) and ii) is particularly advantageous. The unit also comprises a microcontroller or the like unit capable of receiving programming signals from an external electric device and controlling said switching unit based on said programming signals so as to make said connections.

According to one embodiment, the connecting means are programmable to cyclically deliver power from the energy reservoir through the contact areas for a first time period and to communicate with an external electric device (e.g. for programming or monitoring purposes) through said contact areas for a second time period, typically shorter than the first time period. As an alternative to communication or as an additional period, the battery unit may rest for a certain time period in each cycle, meaning that it does not deliver power or communicate during that period. Thus, the battery unit may operate in suitable duty cycles to serve various needs. For example, 80 to 99% of time may be reserved for power delivery and 1 to 20% of time is reserved for the bidirectional communication with the control unit of the tank. The tank can include optional energy reservoir which provides power during the communication or the communication periods of different strings can be interleaved so that power is available at all times.

In one embodiment, the battery unit is capable of delivering power and communicating simultaneously. This can be achieved by using wireless (non-contact) communication or communicating through the contact areas at a predefined frequency.

According to one embodiment, the housing is made of electrically insulating material, such as plastic, and comprises through holes, i.e. vias, into which conductive matter, such as metal, is arranged so as to electrically connect the contact areas on the outer surface of the housing to the connecting means inside the housing. The conductive matter can be arranged to the vias simultaneously to plating the contact areas on the surface of the housing to make a uniform conductor structure.

According to one embodiment of the energy storage system, the battery units are in the battery unit cavity in random or essentially random order and orientation, i.e., randomly packed. In conventional batteries with a modular designs, there may a plurality of battery changeable elements in an order where limited or no variation is possible.

According to one embodiment, the battery units are designed such that they are capable of being, and preferably a majority of battery units in the tank actually are, in touch with at least 5 other similar battery units. Consequently, there are a great number of energy path configuration possibilities in the tank.

According to one embodiment, typically actualized during and immediately after filling of the tank and periodically repeated afterwards on an interval or as-needed basis, the terminals of its energy reservoirs of each battery unit are disconnected from all of their contact areas to avoid undesired or uncontrolled connections, shorts, sparks etc. inside the tank. Also under other conditions, such as excessive local or regional heat build-up, this condition can be invoked.

According to one embodiment, actualized during operation of the tank, i.e., when power is delivered therefrom, for at least a portion of the battery units, the terminals of their energy reservoirs are connected to two of their contact areas so that at least one electric energy path is formed between said at least two contact surfaces of the electric energy tank through the battery units to be able to deliver current from the energy reservoirs outside the tank.

According to one embodiment, the tank comprises a control unit capable of receiving information on the state of the battery units in the battery unit cavity and transmitting programming signals to the battery units in order to form energy paths between said at least two contact surfaces of the electric energy tank through a plurality of battery units.

According to one embodiment, each of the battery units comprises a unique machine-readable identification code, which assists in discovery and configuration of the battery units.

The state of the battery unit may comprise e.g. configuration information, current measurement information, voltage information, charge level information, contact information, number of charge/discharge cycles, or the like. According to one embodiment, the state of the intelligent battery unit comprises at least information on electrical connections to other intelligent battery units through the contact areas of the battery unit. This information may be in the form of current level flowing through one or more of contact areas. A non-zero current implies that there is a contact from the contact area(s) to another contact area(s) or a contact surface of the tank. During state-determination related to a discovery step, the contact areas of the battery unit may be connected in a star pattern, as will be described later in more detail.

DETAILED DESCRIPTION OF EMBODIMENTS

Figure 1A:
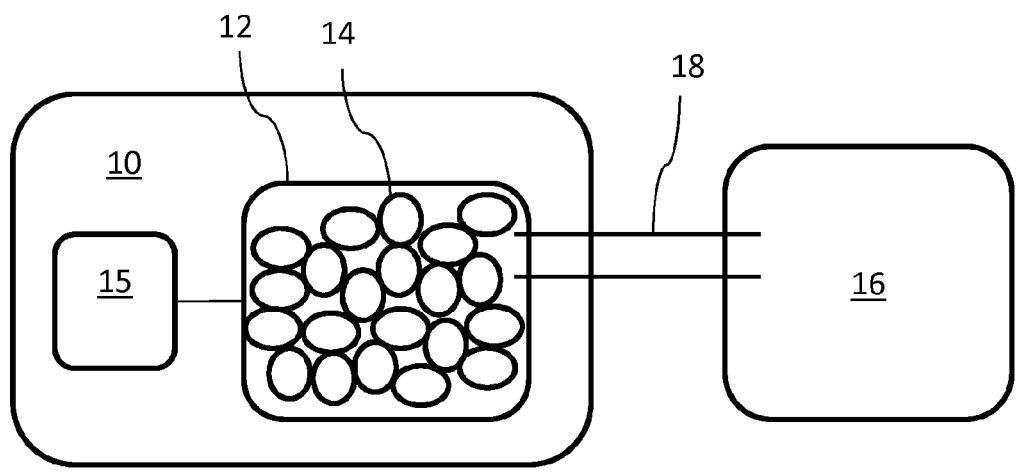
FIG. 1A shows in a schematic view an overall illustration of a system comprising components of the invention.

The following definitions may be helpful in understanding the description which follows:

"Battery unit" is an electric device comprising an electric energy reservoir and means for delivering electric energy out of the electric energy reservoir to the outside of the battery unit.

"Housing" of a battery unit is a shell enclosing and/or providing a mounting point for other components of the battery unit. Typically the housing defines the general outer shape of the battery unit. The housing may be a separate physical part but may be at least partly be formed of other components of the battery unit.

"(Electric) energy reservoir" means any entity capable of storing electric energy and transferring electric power through its terminals.

"Contact area" or "electric contact pad" of a battery unit means a conductive zone accessible from the outside of the battery unit for making a galvanic contact with the battery unit. In particular, a contact area is contactable by a contact area of another similar battery unit when the battery units are placed next to each other.

"Configuration" of a battery unit means primarily the combination of connections between a plurality of contact areas of a battery unit and terminals of the energy reservoir of the battery unit. To give some examples, if the terminals of the energy reservoir are denoted with N and P, in the case of a battery unit with three contact areas A, B and C connections A-N/B-P, A-N/C-P, A-P/B-N and A-P/C-N form different combinations of connections, i.e., different configurations. In the case of embodiments with an additional capability to disconnect contact areas, connect contact areas to internal ground of the battery unit, and/or to interconnect contact areas, also variations in these (dis)connections form different combinations of connections, i.e., different configurations. For example, in the case of a battery unit with five contact areas A, B, C, D and E connections A-N/B-P/C-D, A-N/B-P/C-E, A-P/C-N/B-D, etc form different combinations of connections.

"Bypass connection" means an electric connection between at least two contact areas of a battery unit without involving the energy reservoir, i.e. simply a low resistance path between the contact areas.

"Connecting means" of a battery unit refer to necessary means for changing and maintaining the configuration of a battery unit. The connecting means being "programmable" means that it can be given instructions internally or externally of the battery unit to change the configuration. The connecting means being able to selectively connect the terminals of the energy reservoir to the contact areas in different combinations means that the configuration to be connected can be selected from a set of plurality of potential configurations.

"State" of a battery unit means the current configuration of a battery unit, and may also include one or more other parameters such as the voltage of the energy reservoir, current through the battery unit, energy level of the energy reservoir, temperature, condition of the energy reservoir, etc.

"(Electric energy) tank" is a structure (container of any sort) capable of accommodating a plurality of battery units and means for transferring energy from the battery units to the outside of the tank (power delivery mode) and/or from the outside of the tank to the battery units inside the tank (charging mode). There are two main types of tanks, depending on their intended use: power delivery tanks and charging tanks, but a single tank can involve both these functions, like a tank of an EV typically would do for allowing direct charging. The tank may include also a control unit for programming the battery units, but the control unit needs not be an integral part thereof, but a partly or entirely separate unit connectable with the tank. In a broad sense, "tank" refers to a tank system comprising also the control unit as a functional part. The term "battery pack" may also be used to describe a power delivery tank filled with battery units.

"Contact surface" or tank contact pad of a tank is a conductive zone accessible from the direction of the battery units accommodated in the tank for making a galvanic contact between contact areas of a battery unit and the zone in order to transfer electricity through the zone.

"Fill ratio" means the ratio of volume taken by the battery units in a tank to free space in a tank, when the tank has been filled up with battery units. Since the fill ratio depends in practice on the volume and shape of the tank (in particular with small tank sizes), references to fill ratio herein assume a theoretical tank with unlimited total volume in each direction filled with an unlimited number of battery units, unless otherwise mentioned. The terms "packing" and "packing density" are also used to describe filling and fill ratio of a tank, respectively.

"Random fill ratio" is a fill ratio achieved by providing a number of battery units in random order under prevailing physical conditions (e.g. gravity) to a tank, i.e., without using intelligence to position each unit. Such random packing may occur for example by means of pouring or spouting the battery units to the tank and potentially by additionally shaking or otherwise agitating the tank and/or battery units to increase the fill ratio. In real life, the tank walls and borders may, depending on the shape of the walls and the shape of the battery unit, slightly guide the nearest battery units into a non-random order and orientation. Herein the term "random packing" covers also essentially (nearly) random packing, i.e., any border effect caused by tank walls limiting true randomness is not taken into account.

"Programming" of battery units (or a tank) means changing the configuration of battery units inside a tank. In the case of a randomly filled tank, programming is typically preceded by a discovery and routing process to find out available connections and potential energy paths inside the tank.

"Control unit" of a tank means necessary communication and computing means for communicating with battery units inside a tank and for programming the battery units.

"Discovery" of battery units means a process where a tank determines which battery units are present in a tank and how they are connected with each other and the contact surfaces of the tank through their contact areas.

"(Electric) energy path" means a potential power delivery path inside a tank between its contact surfaces through contact surfaces and/or energy reservoirs of one or more battery units. When the battery units are suitably configured, electrical power can be delivered along this path, either from the battery units to a load outside the tank (power delivery mode) or from an external energy source to the battery units (charging mode). There may be one or more simultaneous electric energy paths in a tank. In a typical case, there are at least two, e.g., 2-50, energy reservoirs of different battery units arranged in series in this path. There may be energy reservoirs arranged also in parallel in each path. The energy paths are herein also called "strings".

"Routing" means a process where one or more electric energy paths are determined to be able to program the battery units accordingly. In a routing process, it is decided for example how the terminals of the electric energy reservoirs shall be internally connected to the contact areas of the battery units and whether optional bypass connections are needed so that electric energy reservoirs are connected in series to form one or more strings. Routing can be done in various ways based on the information obtained by the discovery process using a suitable routing algorithm. For example the discovery process described in this document gives already route information, which could be used for forming the strings.

"Monitoring" means a process where information is collected on the state of battery units by an external electronic device, such as a tank control unit.

System Overview

As introduced above, what is proposed here is a novel utilization scheme for portable energy sources, such as secondary batteries, by providing battery units (BUs) capable of forming larger battery packs with the aid of an electric tank also described herein.

FIG. 1A illustrates an electrical device 10, such as an electric vehicle (EV), comprising an electric tank 12. The tank 12 is connected to an electric load 15, such as an electric motor. The tank 12 is filled with battery units 14 providing power to output of the electric tank 12 and further the electric load 15. The system may also comprise an external battery unit container 16 having transfer means 18 for receiving battery units 14 from the tank 12 and/or transferring them back to the tank 12. Either the tank 12, the external container 16 or both of them may have the capability to charge battery units 15 using electricity from a power network or from other sources such as regenerative braking, solar panels, fuel cells, flywheels or even a hydrocarbon-fueled generator.

As will be described later in more detail, the battery units 14 are equipped with an energy reservoir and contact areas for conducting electrical power out from the electrical reservoir and for recharging the electrical reservoir. In addition, there are connecting means, including a switching logic circuit, for making the desired connections between the energy reservoir and the contact areas. The connection means is programmable to change the configuration upon varying needs and circumstances, most importantly the desired output voltage and power requirements of the load 15 and condition, physical positioning and contacting of the battery unit 14 among and with other similar battery units 14. In particular, the contact areas can be configured freely to act as positive or negative contacts. The configuration of the contacts can preferably be done automatically and dynamically by the switching logic circuit, preferably with the aid of programming signals received by the battery unit from the tank system. Thus, to facilitate the programming, the there may be built-in communication capability in the battery units 14. Communication includes receiving programming instructions from outside the battery unit 14 and may include also transmitting information on the state of the battery unit 14 to an external programming or monitoring unit of the tank system or to other battery units.

According to one embodiment, battery units 14 have a smooth self-contained outer shape, that allows them to be transferred from one container (e.g. electric tank 12) to another (e.g. external charging container 16, or vice versa) by non-intelligent, cost-effective methods, such as pumping or pouring.

Freedom of movement of randomly packed battery units 14 is limited by their shape and friction and optionally additionally by immobilization means, such as means for applying physical pressure to the battery units 14 in the tank 12.

When in use, the battery units are contained in the electric tank 12. The tank 12 comprises a physical container with a cavity capable of accommodating a plurality of battery units 14 in one, two or most preferably three-dimensional configuration. In a typical embodiment, the tank 12 is capable of accommodating at least 10, preferably at least 50 battery units 14. There is no upper limit for the battery units, but in typical embodiments the number of units per one tank is less than 10000, usually less than 5000.

To be able to power the load 15, besides accommodating the battery units 14, the tank 12 comprises electrical contact surfaces on inner surface thereof in order to be able to make electrical contact with two or more battery units 14 and to conduct the electric power from the battery units 14 outside the tank 12. The contact surfaces may be arranged on one or more walls of the tank 12, for example on two opposite inner walls of the tank 12.

According to an embodiment, where the battery units 14 are of externally programmable type, the tank 12 also comprises programming means, most notably a control unit including a computing unit and communication unit, for communicating with the battery units 14. Communicating includes at least controlling, i.e., delivering programming signals to the battery units 14 in order to change their configuration. Communicating may also include monitoring, i.e., receiving information from the battery units 14 for example for gaining data on the relative position and contacts of each battery unit 14 among other battery units. The computing unit is capable of making necessary programming for the battery units 14 to be delivered to the battery units through the communication unit.

It should be noted that the programming means does not need to know the physical position of each battery unit 14 in the tank 12 or most of those. The programming means need to have only a knowledge to form at least one electrical path so that the tank 12 can deliver electricity.

The present system may comprise also one or more charging stations comprising means for replacing used battery units of a device brought to the charging station with charged battery units from another container. The container may for example be a charging silo, comprising means for charging a plurality of battery units and means for providing a desired amount of charged battery units from the silo to the electric tank of the device. The battery units may be randomly packed in the charging silo like on the tank of the device.

Exemplary structures and functional parts of the battery unit and tank system and methods of programming the battery unit are described in more detail below. Unless specifically mentioned or there are obvious technical reasons to the contrary, the embodiments described above and also hereinafter can be freely combined to form a variety of different kinds of operative battery units.

Battery Unit

Overview and Functions (Battery Unit)

Basic and additional functionalities of the battery unit are described below. Exemplary electronics for implementing these functionalities are described in more detail in a separate subsection below.

Figure 1B:
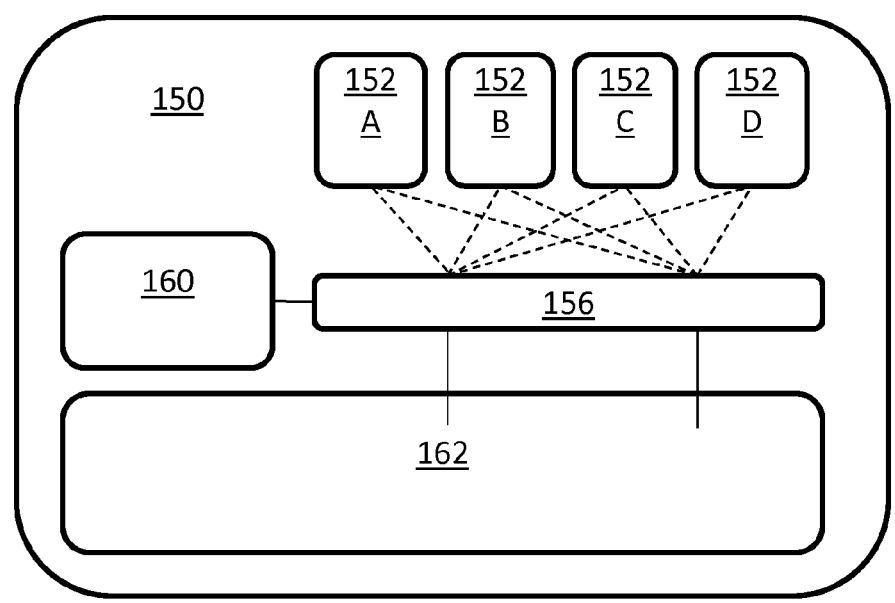
FIG. 1B illustrates in a block diagram a battery unit according to one embodiment of the invention.

FIG. 1B illustrates a block diagram of main components of a battery unit 150. There is an energy reservoir 162 whose terminals are connected to switching circuitry 156 further connected to contact areas 152A-D. The switching circuitry 156 together with a microcontroller 160 functionally connected thereto form the switching logic.

Figure 2A:
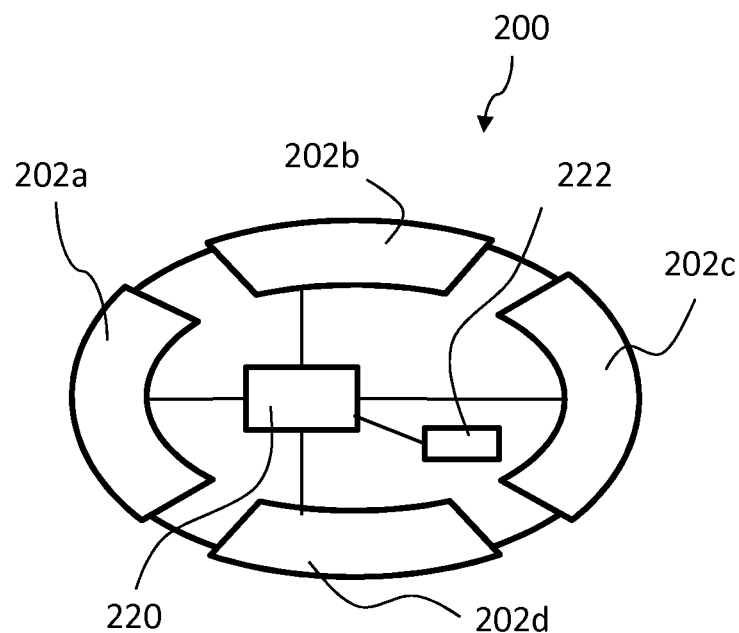
FIGS. 2A-2D show schematic presentation of a battery unit in a general level and in three exemplary configurations.

FIG. 2A shows in a more illustrative view an exemplary battery unit 200. Inside the unit there is an energy reservoir 222 connected to switching logic 220. The switching logic 220 is connected to contact areas 202*a*, 202*b*, 202*c* and 202*d*, the number of which is this example is four. The switching logic makes it possible for any of the contact areas to be connected either to the positive (+) or negative (−) terminal of the energy reservoir.

Figure 2B:
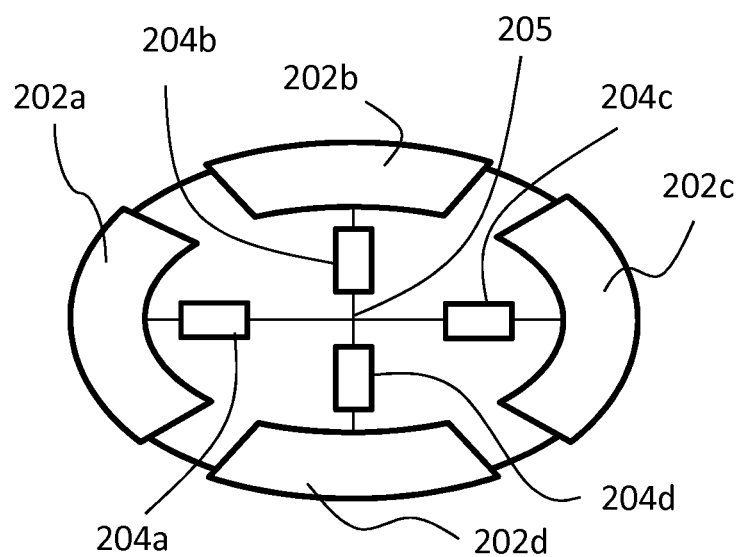
Figure 2C:
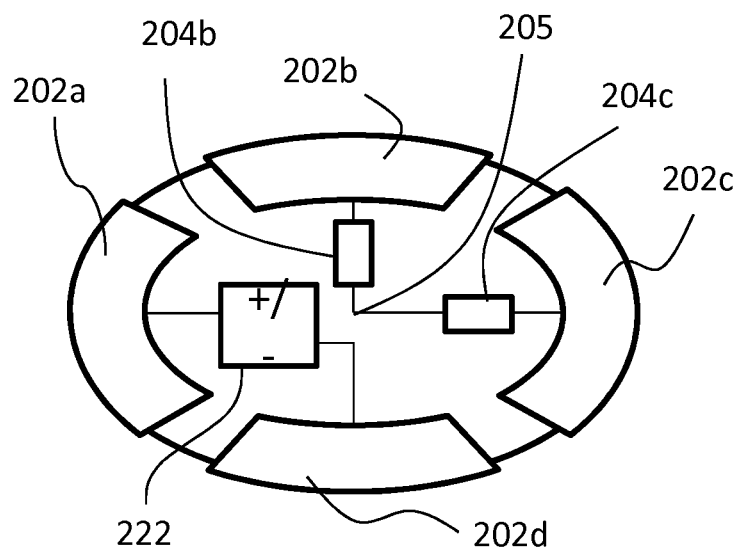
Figure 2D:
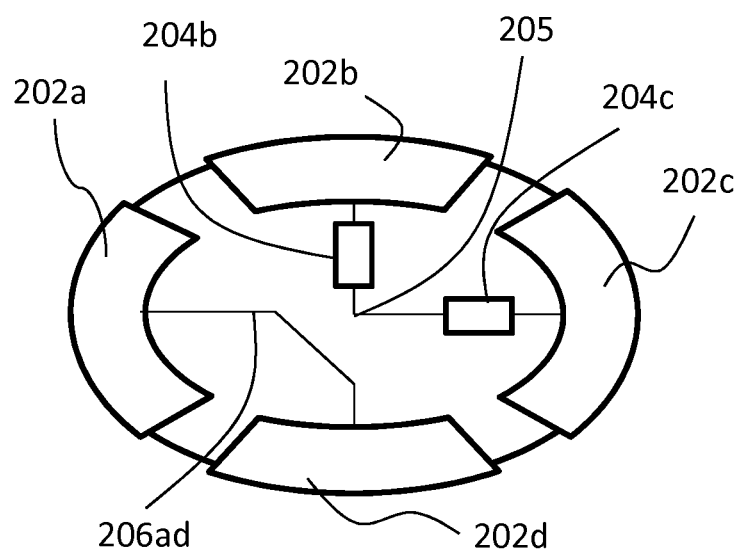

FIGS. 2B-2D illustrate exemplary configurations of the battery unit. FIG. 2B shows a configuration where all contact terminals 202*a*, 202*b*, 202*c*, 202*d* are connected in star configuration to a common star point 205 through resistors 204*a*, 204*b*, 204*c*, 204*d*, respectively by the switching logic. The resistors 204*a*, 204*b*, 204*c*, 204*d* have preferably equal resistances. The common star point represents internal (floating) ground of the battery unit. This embodiment is beneficial in the routing and discovery processes, as explained later in more detail.

FIG. 2C shows a configuration where two contact areas 202*a*, 202*d* are connected to a positive and negative terminal of an energy reservoir 222 and two remaining contact areas 202*b*, 202*c* are in star configuration connected to a common start point 205 through resistors 204*b*, 204*c*.

Additionally, the switching logic may allow any two or more contact areas 202*a*, 202*b*, 202*c*, 202*d* to be connected together to short circuit those (bypass connection). FIG. 2D represents a configuration where two contact areas 202*a*, 202*d* are short circuited by a bypass connection 206*ad* and two remaining contact areas 202*b*, 202*c* are in star configuration connected to a common start point 205 through resistors 204*b*, 204*c*. Equally well the remaining two contact areas 202*b*, 202*c* could be connected to the terminals of the energy reservoir, or to form a second bypass connection.

The above examples show only a small portion of all available configurations. The switching logic 220 is preferably capable of making any of the described connections for any of the contact areas 202*a*, 202*b*, 202*c*, 202*d*. In this way, the polarity or state of each contact area 202*a*, 202*b*, 202*c*, 202*d* can be freely controlled with the switching logic 220 to match various situations and needs.

According to one embodiment, the switching logic is additionally capable of entirely disconnecting one or more of the contact areas from other contact areas, the common start point and the terminals of the energy reservoir.

A key feature of the battery unit is its ability to cooperate with other battery units so as to form a larger power source. For this purpose, the positive and negative poles of the energy reservoir can be connected to any of the contact areas of the battery unit. This enables that the battery units, even if randomly packed inside a tank, can be connected in series and/or in parallel, forming strings of many units. It is irrelevant which battery unit touches which other unit, because the strings are defined by dynamic programming once the relative positioning of the battery units has been determined.

According to one embodiment, the battery unit includes also one or more bypassing connection options. In a bypass connection, current can flow through the battery unit through a low resistance path from one contact area to another without connecting the energy reservoir inside the battery unit to this low resistance path. This option allows the battery unit for example to be used for helping the completion of strings that would otherwise not be possible due to the probabilistic nature of random placement or orientation.

According to one embodiment, the battery unit can be configured to simultaneously deliver energy through two or more contact areas and to be in bypass mode between two or more other contact areas or to disconnect or ground one or more contact areas. Any combination of these functions can be possible, if the switching circuit is designed to allow this.

The above mentioned connection, bypass, disconnect and/or connecting to virtual star point configurations for each contact area are set and updated by suitable connecting means typically built inside the housing of the battery unit. The connecting means may comprise a microcontroller and a switching circuit functionally connected to the microcontroller. These two together form the switching logic.

The switching logic is preferably configured so that it is not possible to contact both terminals of the energy reservoir to the same contact area to avoid undesirable paths or connections. In addition or alternatively, this precautionary function may be implemented in the tank control unit level.

According to one embodiment, the battery unit can monitor environmental and/or electrical characteristics of the unit. These characteristics may include one or more of the following: charge and discharge current, energy reservoir voltage, temperature, state of charge. There are suitable measurement and monitoring circuits for this purpose. There may also be necessary means for changing the configuration of the battery unit based on the monitoring. Or example, if the battery unit notices that the discharge current, temperature, or other parameter is outside a desirable range for the chosen pattern, then it can temporarily disconnect the energy reservoir, decrease current draw, or alter behavior otherwise.

According to one embodiment, the battery unit includes a unique identifier coded therein on the hardware or software level. The unique identifier can be used when communicating with an external central control unit. That is, a battery unit can transmit its unique identifier to the external control unit when announcing its presence in the tank or delivering monitoring information. On the other hand, the control unit may include the identifier in its programming commands such that the battery units are able to distinguish between commands intended for the particular battery unit and commands intended for other battery units.

It is also a basic functionality of the exemplary battery unit that it may communicate with other battery units and/or a central control unit of an electric tank and/or host apparatus of the unit, such as an electric vehicle. For this purpose, the battery unit comprises an internal communication unit adapted to operate using a predefined communication protocol either through the contact areas or wirelessly. The communication unit is functionally connected with the switching logic and optional monitoring circuit. Communication is necessary for being able to define and form the energy paths that allow electric current to be drawn from the tank.

The battery unit may additionally, or in order to assist in carrying out the abovementioned functions, comprise power supply circuitry, charging circuitry, flash, EEPROM, RAM, over-current protection circuitry and clock oscillators, which are also described in more detail later.

Energy Reservoir (Battery Unit)

The energy reservoir may comprise an electrochemical cell of any rechargeable type. Alternatively, the energy reservoir may comprise a high-energy capacitor. A further alternative is a hydrogen fuel cell. One specific example is a lithium-ion cell (nominal voltage of 3.7 V).

The energy reservoir may comprise a plurality of cells or capacitors connected in series and/or in parallel.

The capacity of the energy reservoir may be in the order of magnitude from milli-ampere hours or even less, all the way to dozens of ampere-hours or even larger. The capacity may be e.g. 1 uWh-1 kWh, such as 1 mWh-100 Wh, in particular 1-100 Wh.

The energy reservoir typically takes a major portion, for example at least 75%, in particular at least 90% of the total internal volume of the housing of the battery unit, to obtain high energy density. A smaller volume is needed for the switching logic with communication electronics.

Contact Areas (Battery Unit)

The battery unit comprises a plurality of contact areas or "electric contact pads" on outer surface of its housing. In a preferred embodiment, the housing determines the general shape of the battery unit and contact areas are arranged as coatings or films on the housing material. Wiring from the contact areas to the switching logic inside the housing must be arranged through the housing. However, the contact areas themselves can also extend in full or partly through the housing material. The contact areas are preferably metallic.

The main purpose of the contact areas in the battery unit is to be able to charge and discharge the battery unit while being randomly packed in a container. Two contact areas would be enough if the exact position and orientation of the battery unit could be controlled, like a standard battery attached in a battery holder. In case of randomly or near randomly packed battery units, more connections areas are typically needed to minimize the number of the battery units in the container which cannot be used for supplying power (i.e., battery units whose energy reservoirs cannot be taken as part of any string).

According to one embodiment, the number of contact areas is between 4 and 20, in particular between 6 and 14. This range is estimated to be optimal for at least ellipsoidal battery units but is workable also for other shapes. The exact optimal number of contact areas depends on at least the following: shape of the battery unit, cost and size of electronics, routing process, number of bypasses available in the battery unit, needed creepage and clearance distances, materials used, required physical and environmental protection, chemical and/or corrosion resistance (e.g. when using liquid cooling), thermal conductivity requirements, assembly process, projected lifetime, available technology, serviceability, reliability, cost and budget constraints.

Figure 2E:
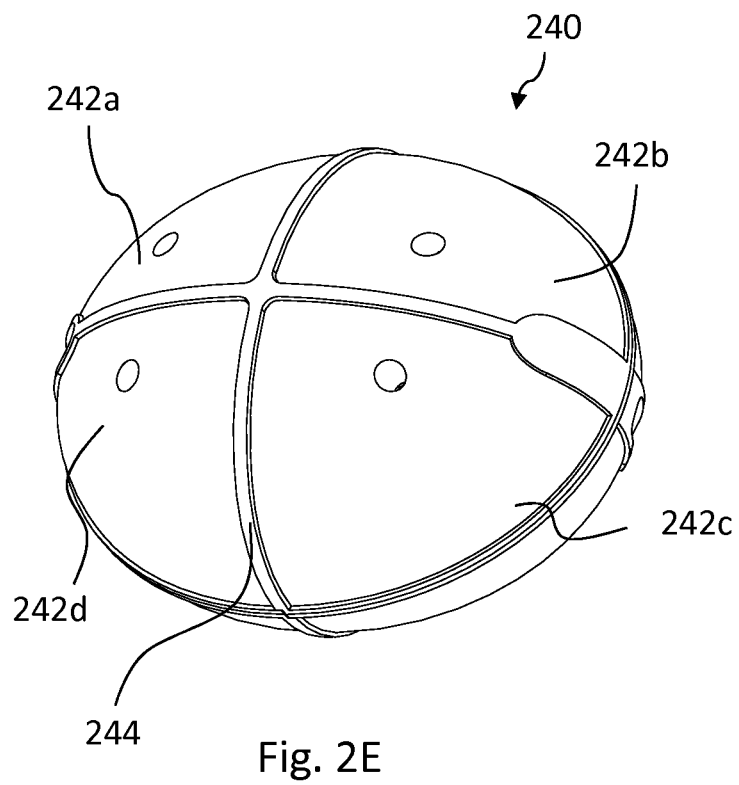
FIGS. 2E and 2F illustrate an ellipsoidal battery unit according to one embodiment in a three-dimensional perspective view and in top view, respectively.
Figure 2F:
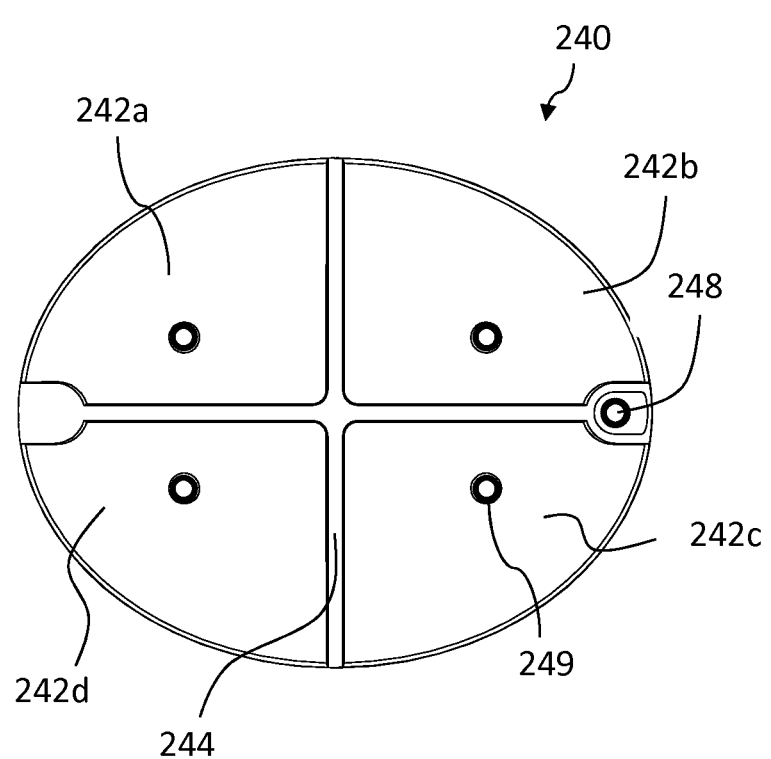

FIGS. 2E and 2F illustrate an ellipsoidal battery unit 240 with eight contact areas (four symmetrically on each half-ellipsoid). Four contact areas 242a-242d are visible in the figures. The contact areas 242a-d are separated by gaps 244, which are herein provided with a ridge of insulating material, preferably the housing material. The half-ellipsoids have been fastened together from attaching points 248 on each end of the half-ellipsoids. The contact areas are connected to internal parts of the housing using conductive vias 249.

A via is an electrical connection between two electrically conductive layers through insulating material. Typically a via is a small opening that is made conductive by electroplating or by inserting a rivet. Vias are typically used in printed circuit boards and integrated circuits. Several injection molded plastic materials can be also plated with conductive metal layer. Plating process can be electroplating or electroless plating. This makes it possible to utilize vias also in plastic part, where both sides of the plastic part are plated and electrical connection between the plated sides is required.

Figure 2G:
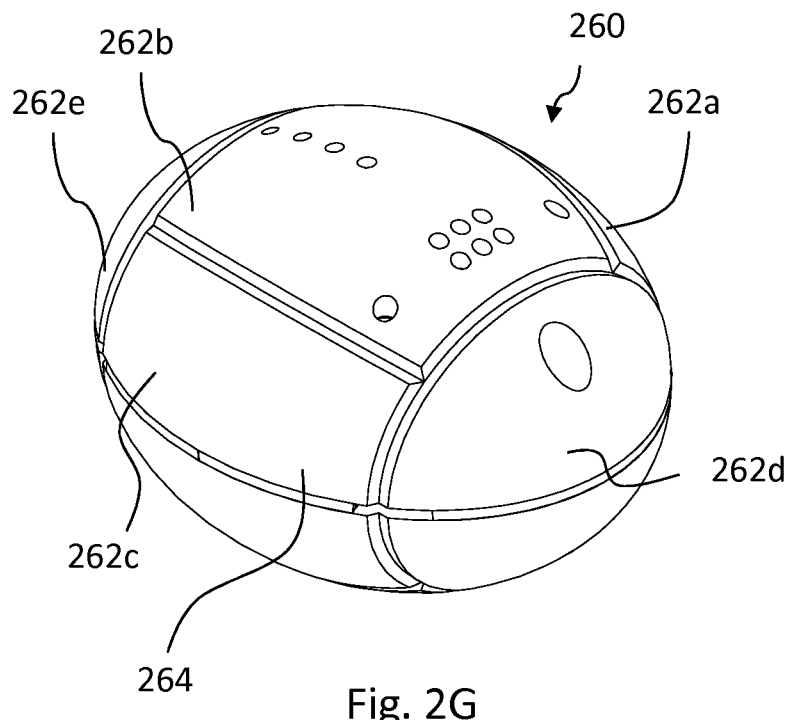
FIGS. 2G and 2H illustrate an ellipsoidal battery unit according to another embodiment in a three-dimensional perspective view and in top view, respectively.
Figure 2H:
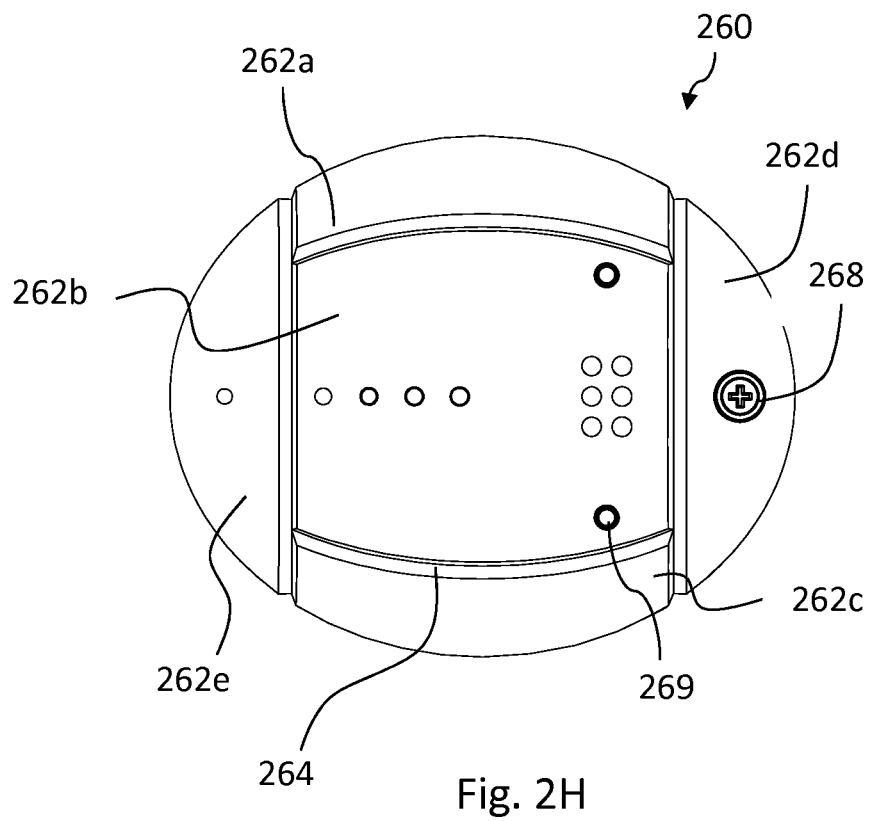

FIGS. 2G and 2H show another ellipsoidal battery unit 260 with six contact areas (four areas symmetrically on a circumference of the ellipsoid and two symmetrically on each end). Five contact areas 262a-e are shown. The contact areas 262a-e are separated by gaps 264 herein shown as grooves. An attaching point 268 is also shown.

Figure 2I:
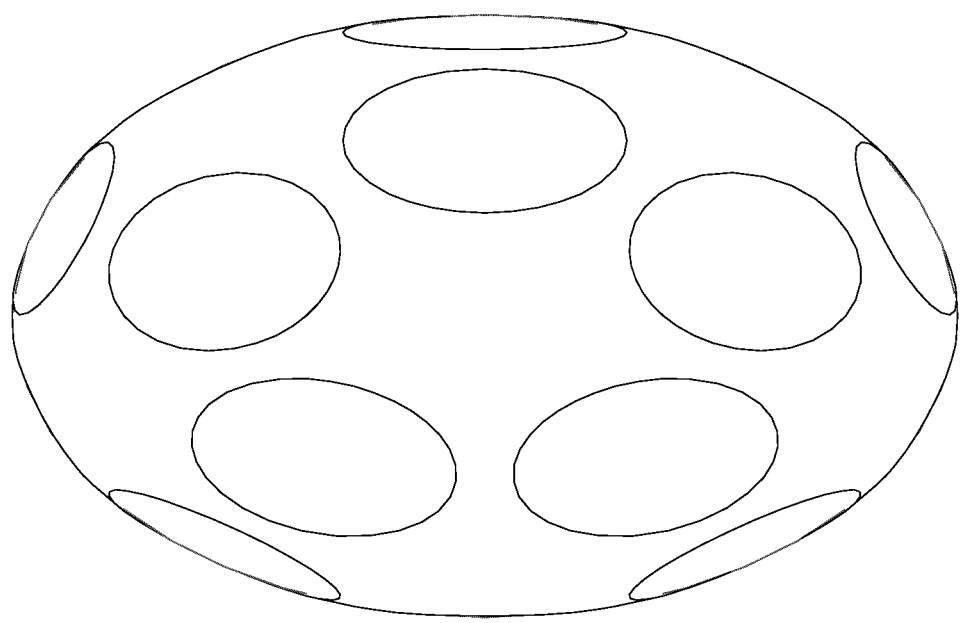
FIGS. 2I and 2J illustrate contact area patterns further an ellipsoidal battery units according to alternative embodiments.
Figure 2J:
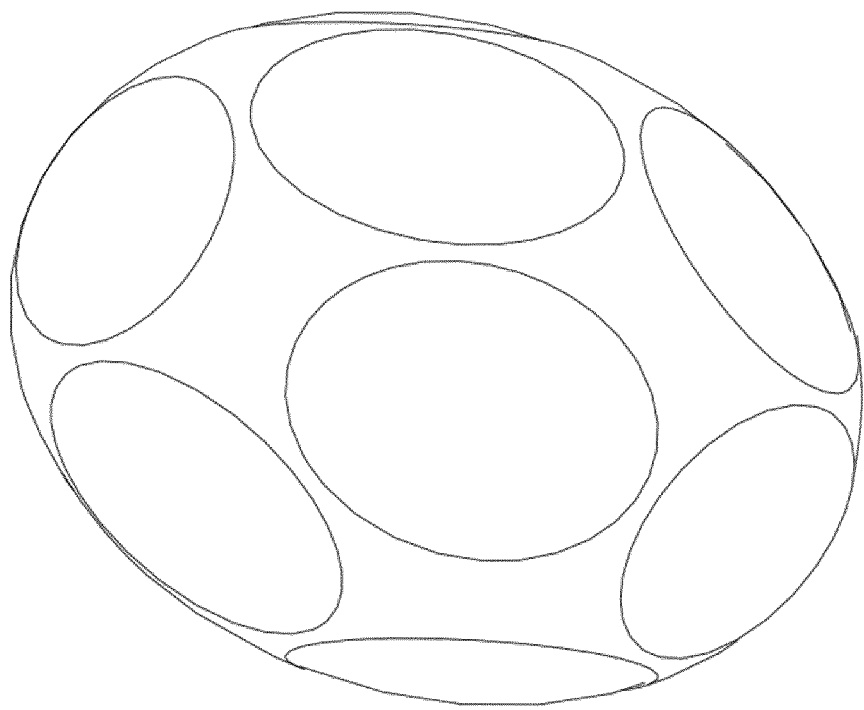

There are also various other fully operative contact area configurations available. FIGS. 2I and 2J further illustrate some examples of the almost endless possibilities of contact area positioning. In these embodiments, there are 10-20 oval-shaped contact areas arranged on different sides of the battery units such that a considerable space remains around the areas. With these configurations too, the possibility of contact area to contact area connection has high probability in random packing. At the same time, the possibility that two different units make a contact with a single contact area is smaller than in embodiments of FIGS. 2G and 2H, for example. The conductive via 269 is used to connect the contact areas to internal parts.

The contact areas can be applied on a surface of the housing with as suitable method, which are known per se. Examples include film or sheet application methods (by e.g. using adhesive, stamping, heat and/or pressure) and direct coating methods. The film or sheet or the coating substance is preferably a metal, such as copper, gold, silver, aluminum, or a metal alloy or metal composite. The film or sheet may be pre-formed to match the shape of the outer surface of the housing or formed during the application process.

Figure 3:
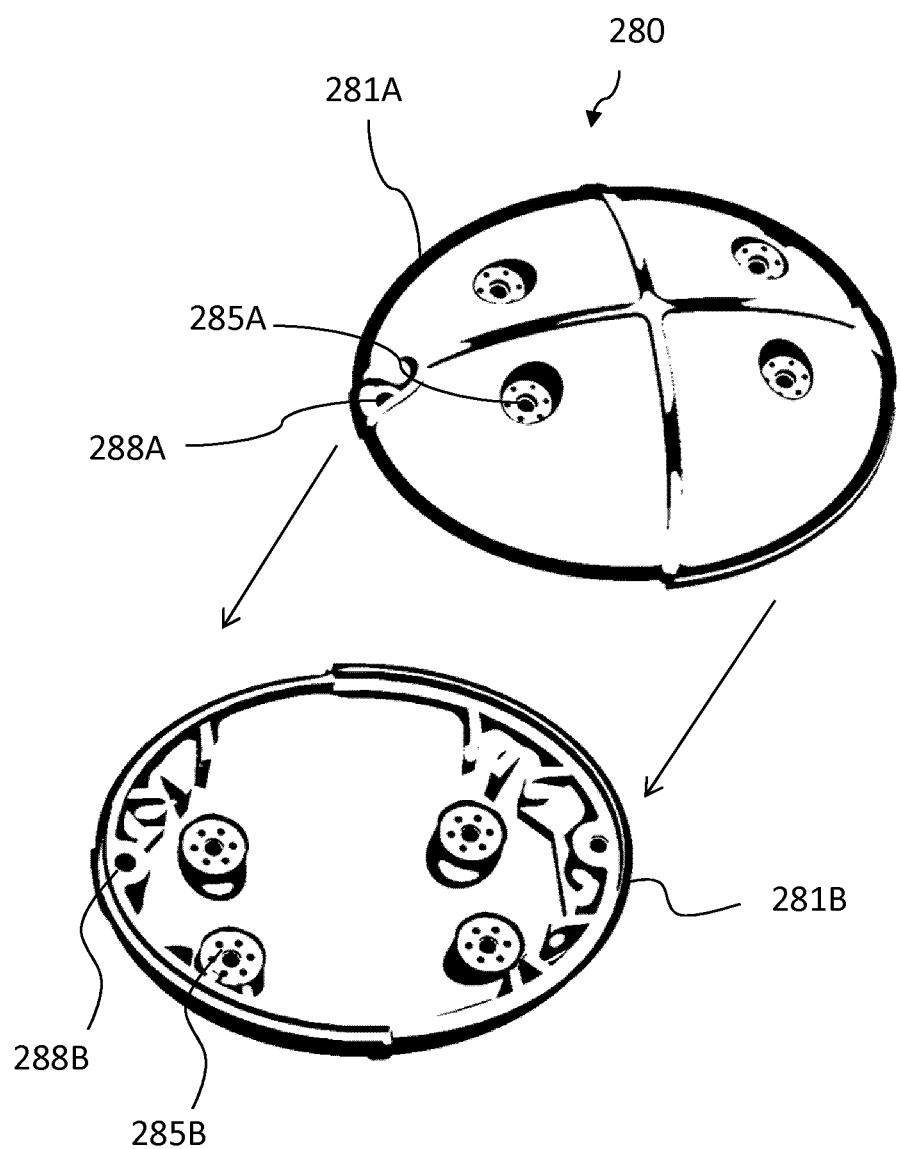
FIG. 3 illustrates an exploded view of a housing of a battery unit according to one embodiment of the invention.

FIG. 3 illustrates one possible realization of the housing mechanics and internal structure of the housing for a battery unit 280 having a contact area configuration according to FIGS. 2E and 2F. The housing is formed by two preferably identical hollow half-ellipsoid portions 281A, 281B which are attachable together using screws, glue, ultrasonic welding, potting, molding or any other suitable attaching means. Attaching can take advantage of attaching zones 288A, 288B designed to the portions 281A, 281B, respectively.

The contact areas are connected to internal parts of the housing using conductive vias 285A, 285B. The vias 285A, 285B may simultaneously act as anchor points for internal members of the battery units, most importantly the energy reservoir and/or a circuit board for its configuration electronics. In this case, the vias 285A, 285B contain apertures through which screws or like fixing members can be assembled. There may be a conductive plating on the inner surface of the apertures or the fixing members may be conductive to form a robust connection between the contact areas and the electronics. In one embodiment, there are snap-on connectors on the inner surface of the housing.

Electrical contacts between the battery units are important for their co-operation. Using hard gold plating on all the electrical contact areas provides a small and stable contact resistance already with small normal force. To give some rough informal and non-limiting values, electrical contact, between gold plated contacts having only 0.4 N normal force, results about 20 mOhm contact resistance. Even smaller normal forces like 0.1-0.2 N are usable. Hard gold is also good in corrosive environments. Wear properties of hard gold are good, giving about 1000 insertion cycles to failure with 1 μm coating thickness. Wear properties can be often drastically improved by usage of lubrication. Another potential coating material is palladium-nickel combined with flashed hard gold surface. For high-volume versions where cost constraints dominate, more cost effective materials, plating and methods are workable, possibly with some trade-offs in performance.

The necessary normal force can be achieved by means of gravity only, using additional pressure subjected to the battery units in the tank or a combination of these. Additional pressure applied also helps to immobilize the battery units in the tank. Pressure can be applied using one or more springs, elastic members, movable members or gas-inflatable members inside the tank or assembled on or as a wall thereof.

Size and Shape (Battery Unit)

The size of the battery units depends on their intended use. The optimal size of the battery units depends on several parameters. If the battery units are to be transferred via a hose or other conduit (to fill or empty a tank), the maximum size is limited by the maximum practical diameter of the hose or conduit. For EVs, as a rough assumption, a battery unit that can be pumped through 5 cm diameter hose could be still practically used. The minimum reasonable size of the battery unit is limited by components, like control electronics, which cost and size remains about constant independent of the battery unit size if the number of the contact areas is the same. When the battery unit size gets smaller, cost per capacity increases and capacity per volume decreases.

The shape of the battery unit can in principle be almost anything. For an optimized design however, several parameters should be considered. Most importantly, the shape has a big impact to capacity per volume. The container could be filled with the battery units by pumping or pouring. As a result, the battery units are mostly randomly packed in the container. Every geometrical shape has its own typical fill ratio range. Fill ratio is a parameter used to characterize the maximum volume fraction of the objects obtained when they are packed.

According to one embodiment, the battery unit has a smooth shape, i.e. a shape without sharp corners or edges. According to a specific further embodiment, the shape is free from flat surfaces. Such shapes are typically entirely convex, like an ellipsoid or sphere.

According to one preferred embodiment, the battery unit has an ellipsoidal shape. This allows for high random fill ratio and stable positioning of individual battery units in a container. One of the densest known random fill ratios, with a number of about 0.74, is a particular type of ellipsoid, with semi-axes of 1.25:1:0.8. For this ellipsoid, random fill ratio is also very close to the densest known possible fill ratio, making it a good candidate for battery unit shape. At the same time, the fill ratio is low enough to allow the use of a gas or liquid between the battery units for cooling the container and the battery units. The term "ellipsoid" herein means a true ellipsoid, i.e., at least one of its semi-axes has a different length than the two others.

According to one embodiment, the battery unit has spherical shape. For a sphere, the fill ratio is in the range from 0.56 to 0.64. Typically a fill ratio of 0.56 can be achieved when the spheres are poured to a container. A fill ratio of 0.64 is achievable after extensive agitation, like by shaking the container. On the other hand, if spheres are manually placed to the densest possible packing, 0.74 fill ratio is achieved. The large difference between the densest possible packing and typical random packing means that although being possible, the spherical shape is not the best for the battery unit, because random packing leaves lot of potentially "loose" battery units, which are not stationary during the operation in the container. Additional and unique drawback of spheres is that the shape does not lock to any of its rotational freedoms. It is therefore preferred to use a shape having always at least one rotational freedom restricted or entirely locked when randomly ordered in a large container.

Surface finish and surface friction rates of the battery units also affect the fill ratio to some degree. Smoother surface and less friction generally result in better fill ratios. Also, the shape and the size of the container compared to the size and the orientation of the battery units affects the fill ratio. The closer the battery units are to the typically flat walls of the container, the less likely they are to be randomly oriented because of the effect of the wall. Consequently, in larger containers, more battery units are fully randomly oriented, resulting typically better fill ratios.

Another important parameter is the energy reservoir fill ratio inside the battery unit. Shapes like cylinder and rectangular box would be ideal shapes as far as this parameter is concerned, because these are typical existing shapes of electrochemical battery cells. For general ellipsoid, good energy carrier fill ratio can be achieved by using the so called "jelly roll" cell design for lithium batteries, allowing efficient use of space available for the cell in the battery unit. Jelly roll design is known per se and presently used for rechargeable batteries. In the design, an insulating sheet is laid down, then a thin layer of an anode material is laid down, a separator layer is applied, and a cathode material is layered on top. Then those are rolled up for example into form of cylinder. By using other forms than rectangular for the layers, it is possible to have different forms for the cell.

A further important shape-related parameter is the average number of contacts between the battery units in random order. More mechanical contacts between the battery units mean more potential working electrical contacts between the battery units, which allow more possibilities to form the strings. Also, more mechanical contacts between the battery units will help keeping the battery units stationary during the operation. According to a preferred embodiment, the shape of the battery unit is chosen to provide at least 5, preferably at least 9 contacts in average with other battery unit in random order. For example randomly packed spheres have around 6 contacts, while the preferred ellipsoid (1.25:1:0.8) is found to have even 11 contacts on average.

Still another important shape determined parameter is the curvature. On high curvature areas it is beneficial to have small electrical contact shapes or avoid them completely to minimize the number of the battery units, which form a connection with the same electrical contact area.

A relevant shape determined parameter is also the maximum outer dimension of shape per volume of shape. Big values lead to small sized battery units increasing the system cost and decreasing the system capacity per volume. As far as only this parameter is concerned, sphere is the most optimal shape. The preferred ellipsoid form is also relatively good.

Finally, an important shape determined parameter is also the deviation in cross sectional area in different orientations: less deviation means more even speed and less probability for clogging while pumped through a hose or conduit. A sphere, which has zero deviation, would be an optimal shape for pumping, but ellipsoids can also be well pumped. Shapes that would stack to each other should be avoided in pumping applications. Sharp corners in shapes should also be avoided because of excessive wear and problems while pumping.

Electronics (Battery Unit)

The battery unit includes, preferably within the housing, necessary electronic components and connections for controlling the connection configuration of its contact areas, for discharging and charging the energy reservoir, and optionally for monitoring the state of the battery unit and for communicating with an external control unit monitoring and connection programming information.

Most importantly, the electronics includes necessary switching logic defining contact areas are connected to the terminals of energy reservoir and optionally which contact areas are functioning as bypass routes.

According to one embodiment, the battery unit includes a microprocessor, such as a microcontroller, a clock oscillator, memory, communication circuitry, monitoring circuitry, power supply circuitry, switching circuitry. In addition, depending on its functionalities it may include one or more of the following: charging circuitry, over-current protection circuitry, and circuits for bypass buses. The memory may include flash, EEPROM and/or RAM.

The internal functions and communication functions of the battery unit are preferably powered by the energy reservoir. However, there may also be provided a separate power source, such as a coin battery or the like small power source, for providing the necessary electricity for these functions. The separate source may also be arranged to be used only if the main energy reservoir of the battery unit is completely depleted.

To avoid unwanted paths and connections, over-currents and the like problems during random filling of a container, the terminals of the energy reservoir are preferably disconnected from the contact areas. Only once the filling has been completed, a battery unit connects the terminals of the energy reservoir based on viable routes towards the load, established by communicating with peer battery units, a centralized control unit, or both.

Transmission part of the communication circuitry is used for sending messages out from the battery unit, to other battery units or to the central management unit. Receiving part of the communication circuitry is used for reception of messages.

Monitoring circuitry preferably measures the voltage, current and temperature of the energy reservoir, current and temperature. In addition, it may measure the voltage of each contact area referenced to a virtual ground point of the battery unit. These voltages correlate directly to the current floating through the contact areas of the battery unit. The monitoring circuitry may also track battery health, number of cycles, and how it behaves against an expected wear curve for the particular energy reservoir in question. Internal memory of the battery unit can be used for storing temporary or permanent monitoring data.

The communication circuitry is typically used for sending and receiving messages to and from an external central control unit of a tank. This is typically achieved through conductive contact surfaces on the inside wall of the tank and contact areas of the battery units, but also other methods such as light pulses in the infrared or visible spectrum, or radio frequency induced, or wireless communication are possible.

Individual battery units may in a specific configuration thereof have their contact areas connected to each other through resistors in a star pattern, which can be taken advantage of if a galvanic communication method is used. To facilitate pass through of data, if a large number of the battery units are present in a container, most of the battery contact areas are connected to other contact areas through relatively high impedance resistors forming a resistor network. When one battery unit applies a voltage on one or more of its contact areas, while grounding one or all of the remaining contact areas to its internal ground, it will induce a current through some or many of the other battery units and the resistors connected to the contact surface on the inside of the tank. This induced current can likely be measured by some or all of the other battery units, and by the control unit. By using modulation techniques, such as on-off keying, or any other, data can be transmitted and received by other battery units and the control unit.

In order to maximize the probability that the induced currents for communication are large enough, to be measured with a sufficiently large signal to noise ratio, an elevated voltage level could be desirable. Battery units and the external control unit may generate a higher voltage using a power supply that can be switched off during periods when no communication is needed.

Most to all of the above functions can be implemented into an application specific integrated circuit, or ASIC, yielding the lowest possible component cost in volume, in addition to being footprint optimal. The semiconductor technology chosen depends on the required performance in certain areas: power consumption, switching losses, any needed RF circuitry, analog performance, amongst others.

Electronics Example (Battery Unit)

Next, a specific non-limiting example of battery unit electronics is described to illustrate how the invention can be carried out in practice.

Figure 7:
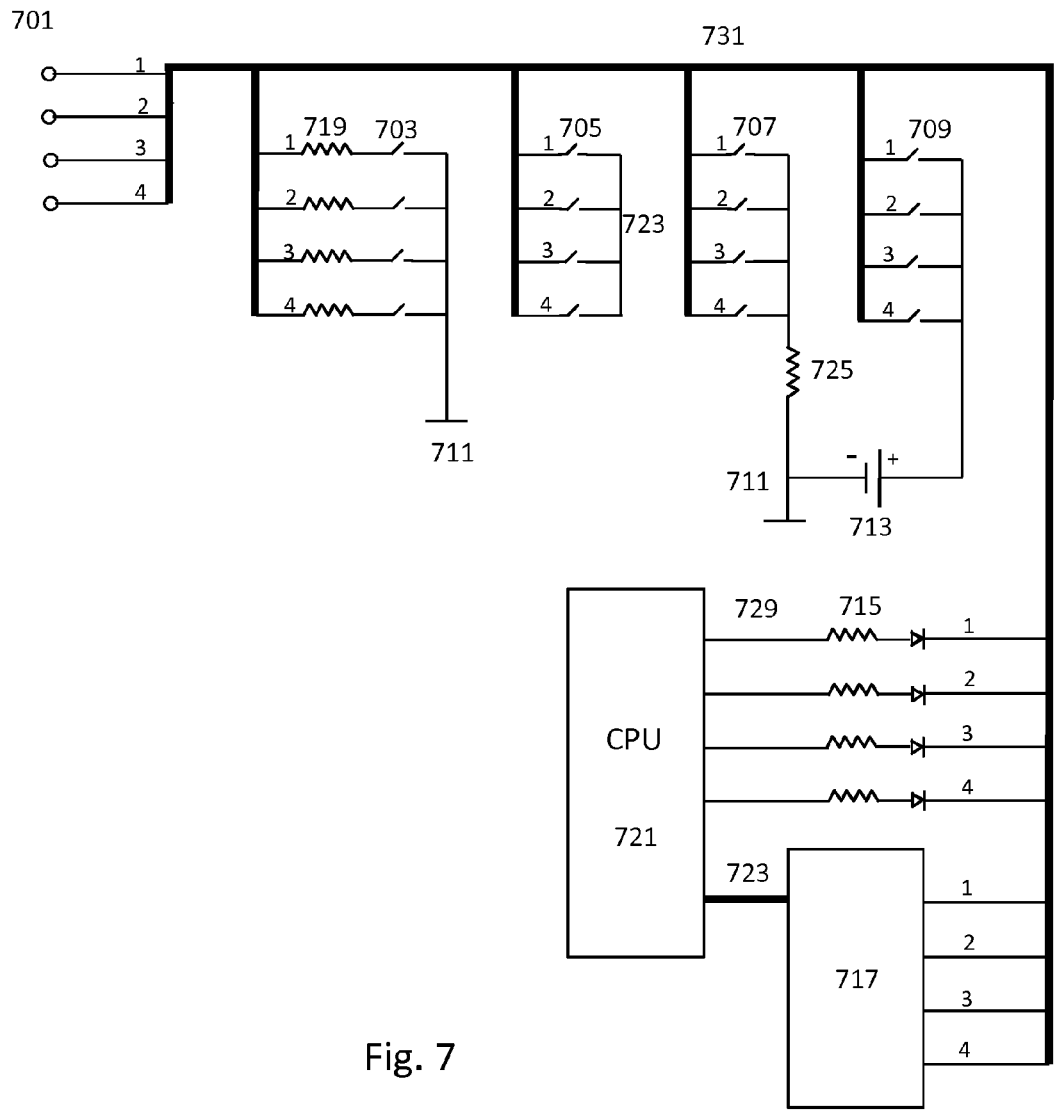
FIG. 7 illustrates an exemplary circuit of the battery unit as block diagram.

FIG. 7 shows a block diagram of the battery unit which contains 4 contact areas 701.The battery unit is managed by a CPU 721, such as a microcontroller. Clock oscillator(s) (not shown) are connected to the CPU and are used for timekeeping. There may for example be two clock oscillators: a higher frequency crystal for high speed operations and timing, and a lower frequency crystal for timekeeping in low power sleep mode. Each contact area 701 is connected separately via connection bus 731 to the other units described below.

The battery unit has an optional bypass mode, in which any contact can be connected to any other contact and pass signals and power. CPU controls the bypass connectors 705. It is possible to connect any contact to bypass bus 723 by switching connectors 705 on/off. The battery unit can include also include more than one bypass bus, buses are independent from each other. The bypass switches can utilize MOSFET technology, for example.

Data is received by the battery unit through the measurement and data receiver unit 717. The measurement and data receiver unit 717 includes a comparator per each contact. The comparator receives on one terminal a reference threshold voltage, which is produced by the CPU. On the other terminal is a (divided) contact voltage. In low noise environments, the threshold can be set very low and the battery unit can receive very small signals. In a high interference environment, the threshold can be set as high as needed. Noise immunity improves, but at the cost of sensitivity. The output 723 from the comparators is fed into the CPU and decoded as needed.

The measurement and data receiver unit 717 can include also, e.g. a temperature coefficient resistor or any other type of temperature sensor to enable to measure the temperature of the battery unit. The unit includes also the energy reservoir current measurement circuit, which optionally amplifies the voltage drop over the shunt resistor 725, which is then sampled by the measurement and data receiver unit 717. The unit also measures various voltages and tracks the energy reservoir state of charge.

Each contact 701 can be connected via a resistor 719 to the virtual ground point 711 ("star point") of the battery unit. This allows for a star network inside the battery units through which all the battery units can communicate. Unless circuitry is employed that allows disconnection of the resistors, some power is dissipated under certain conditions. Such conditions could be when the energy reservoir is connected to certain contact areas, and when the battery unit transmits data. The power levels, however, are negligible if such resistor values are chosen suitably. The voltages measured over the resistors 719 are a function of the current flowing through the contact, and this information is used for routing and other purposes. The voltages are measured by the measurement and data receiver unit 717.

In order to transmit data from the battery unit, an uplink voltage is fed into the most appropriate contact area 701 from the CPU via lines 729. Optionally data can be transmitted using several contact areas 701. The resistors 715 limit the current. The data format and coding can be one of many, e.g. standard serial data, PWM or PPM methods. Typically, many or all other contact areas could be connected to the virtual ground point 711 of the battery unit using switches 707 and benefit the signal strength on the receiver side.

The negative terminal of the energy reservoir 713 is connected to one of the contact areas via shunt resistor 725. The CPU controls the switches 707 to determine to which contact area negative terminal is connected. The positive terminal of the energy reservoir 713 can be connected to a one of the contact areas by switching on/off switches 709.

The battery unit can include several power supplies (not shown) e.g. for providing reference supply, standard low dropout regulator and boost supply which can be used to fully activate MOSFETS and to provide a higher voltage to enable stronger transmit signals.

It should be noted that the above example is intended to illustrate the principles of implementation of a battery unit and there are various other ways of implementing the functions of the battery units. In practice, most or all of the components and wrings discussed may be integrated into a single custom chip, allowing considerable reduction in cost and size compared with separate components.

The battery unit may rest for a certain time period in each cycle, meaning that it does not deliver power or communicate during that period. When the tank is filled with the battery units, the control unit starts the synchronization process. The control unit sends first wake-up signal to the battery units so that the battery units are prepared for the communication. After that the control unit sends synchronization signals: based on the synchronization signals battery units can synchronize the internal clock. This enables that, e.g. all the battery units in certain string delivers power at the same time, e.g. 90% of time and rest of the time 10% is reserved for the communication. Synchronization process can be repeated periodically during the operation. According to one embodiment, the battery unit is capable of being driven into several separate power states, e.g. a low power consumption state (resting state) and high power consumption state There could be several power states (sleeping states) between these two states which are used during normal operation to minimize the power consumption, e.g. there is no need to power everything on in CPU when there is no communication between the control unit and the battery unit. In high power consumption state the battery unit delivers power to outside of the battery unit. In the sleeping state(s), the battery unit is capable of communicating, and changing its configuration. In the resting state, the internal functions of the unit are at minimum, the battery unit still being capable of waking up upon receipt of a wake-up signal typically through the contact areas. The battery unit goes to the resting state to prevent damaging the energy reservoir, e.g. if the cell voltage is low which is monitored periodically.

Environmental Aspects (Battery Unit)

The present battery units can be designed from the onset with minimal environmental impact in mind; maximum recyclability is a primary objective. Raw materials, such as housing plastics, lithium battery cells, silicon, metal wiring, etc. can be chosen to allow for as close as possible to 100% of recycling. Additionally, the recycling methods chosen allow for low-maintenance and low-threshold recycling methods, such as shredding. Material separation, recovery, and re-use or recycling can reach very high levels and be performed using simple methods, after which practically all material can be used for the production of new battery units or other products. Also, because for each battery unit, its history, ownership, usage pattern etc. could be uniquely identified throughout its lifecycle, only battery units at the actual end of their economic lifespan are recycled. Additionally, if battery units were not to be recycled and to end up in a landfill or elsewhere in the environment, they are almost completely non-toxic and of no impact to living organisms.

The energy reservoir in the battery unit can be replaceable and the identification and/or history data of the battery unit at least partly rewritable or erasable such that the same housing and electronics can be used again with a fresh energy reservoir once the previous one has degraded too much. The contact areas may also be re-plated if worn.

Other Aspects (Battery Unit)

Battery units providing a random fill ratio of less than 100%, in particular less than 80%, can be cooled, if needed, by allowing air or other gas to flow between the units. Thus, a certain amount of cooling for components dissipating power or that are otherwise temperature sensitive can easily be provided. The battery unit can be used in an environment optimized for certain requirements, whereby controlled circulation of air, or any other gas or coolant, between the units can be employed.

The battery units herein described withstand typical working environments, including physical stresses induced by filling and emptying the battery unit container, or by mobile use of the device it powers. Typical environmental stresses include static and dynamic stresses, vibration, shocks, wear, temperature cycling, humidity, dust and corrosion.

Electric Tank

The electric tank herein described enables the formation of one battery from plurality of the battery units which could be randomly packed inside the tank in common space where there are no exact position or compartments for battery units. The space may have a regular form, such as rectangular form, but may as well be non-rectangular or irregularly shaped.

The tank can be emptied partly or fully and re-filled quickly with partly or fully charged battery units from another container using cost-effective methods. Thus, a user can "refuel" a BEV in about the same time as cars using a combustion engine and filling resembles the familiar process of filling up vehicle with motor fuel. The tank can be also charged by plugging in the vehicle, without removing the battery units.

The tank described herein can be used as a source of power for EVs. It can be used in a PHEV or BEV. In an EV, the tank can hold hundreds, thousands or even tens of thousands of units simultaneously, but it is equally suitable for small electric devices using only a few battery units, such as power tools. Indeed, in addition to EVs, the invention has also many other potential applications, where rapid and easy replacement of electrical energy or electrical energy storage units is desirable—typically cases where devices are predominantly mobile and using a power cord is inconvenient or impossible.

The tank described herein is not limited to use as an energy source for a load, such as in the case of EVs, but can be used as a recharging tank too. Such recharging tanks can be used, e.g. at service stations for storing and recharging used battery units emptied from EVs tanks. A tank can also have both functionalities, i.e. electric supply and recharging functionalities, like tanks of EVs preferably do.

Overview (Tank)

The operation and configuration possibilities of an exemplary tank are illustrated below by means of an example.

Figure 4:
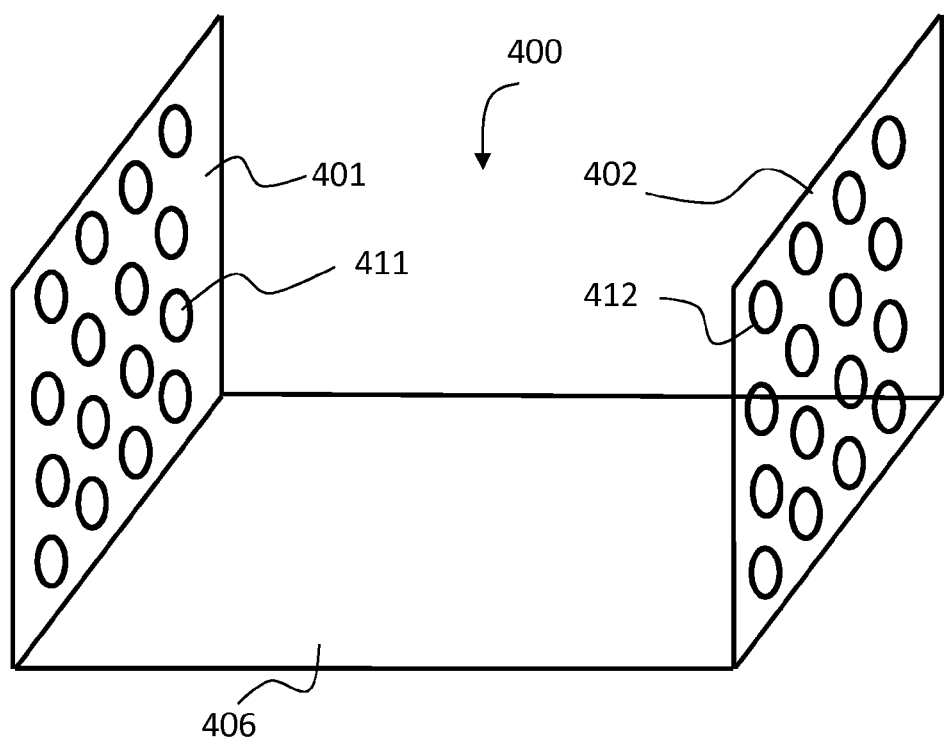
FIG. 4 shows in a schematic perspective view a contact surface configuration of an electric tank according to one embodiment of the invention.

First, FIG. 4 shows a schematic tank 400 with a container 406 (front, back and top walls not shown). The container has two opposite walls serving as contact plates 401, 402 for battery units (not shown) placed inside the container 406. Each contact plate 401, 402 comprises a plurality of contact surfaces 411, 412 (in this case sixteen) capable of individually contacting contact areas of battery units. In general, the number of contact surfaces in a plate may be, any number, but tanks of larger capacity will typically have more contacts. The contact surfaces 411, 412 need not necessarily be arranged into two groups as herein shown but this arrangement is advantageous because separate switching logic units can be provided for each plate, as will be described later in more detail. On the other hand, there may be more than two plates (and switching logic units). The number of plates can be 1-8, preferably 2-4. Placement of the plates on opposite walls of the container is also not necessary. However, the illustrated placement symmetrically on opposite walls of the container ensures equal average contact forces between the battery units and the plates 401, 402. Plates do not necessarily need to be rectangular or flat surfaces, but can be shaped in any form if tanks are of a particular non-uniform shape.

The sizes, forms and placements of the contact surfaces are designed such that the probability that the contact areas of battery units randomly filled to the tank make electrical contacts with the contact surfaces is high. Of course, this depends on the design of battery units too. It may for example be desirable that at least 10% of the battery units that come into physical contact with tank walls are also in electrical contact with a contact surface, or that 50% of battery units that come into physical contact with the contact plates make an electrical contact with a contact surface of that plate.

Figure 5A:
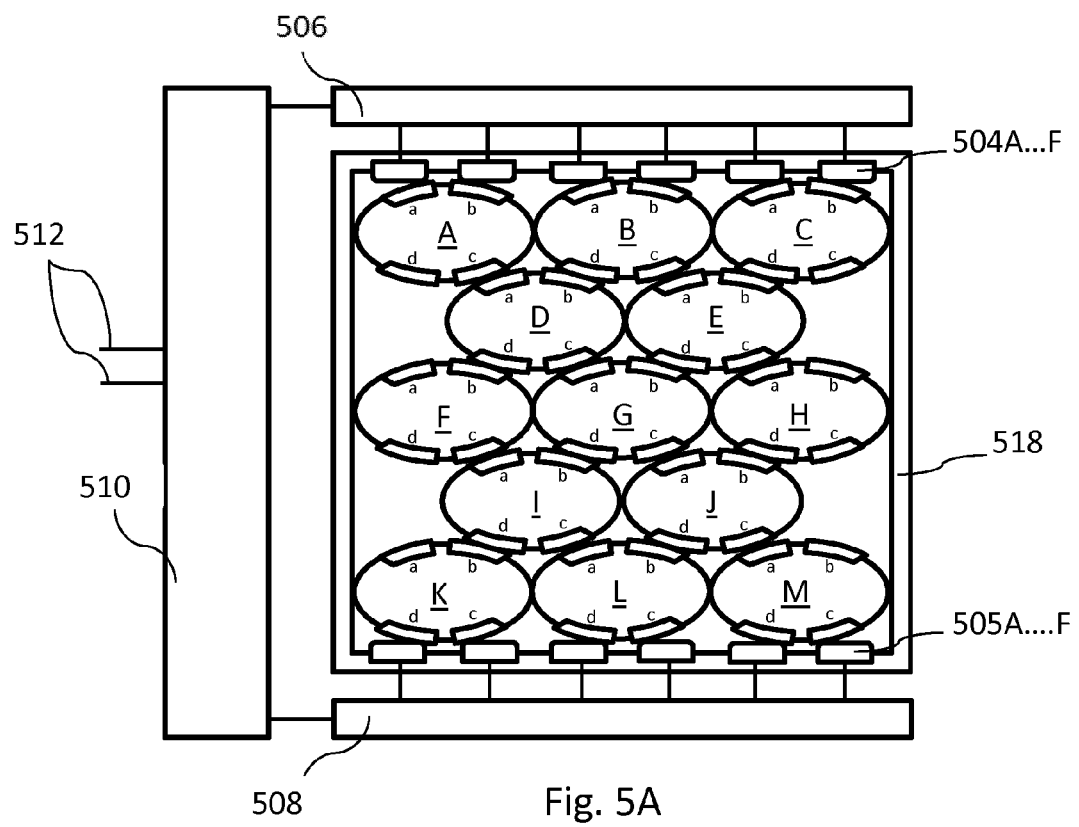
FIGS. 5A and 5B illustrate a block diagram of a non-randomly packed electric tank in a two-dimensional cross-sectional view.

FIG. 5A illustrates in a two-dimensional schematic view an electric tank comprising several battery units of kind described above. The tank provides electricity out from outlets 512 (+) and (−). There are 13 battery units A, B, C, . . . M inside a battery unit cavity 518 of the tank. Although herein illustrated in well-ordered configuration for simplicity, the battery units are in practice typically randomly or essentially randomly packed inside the tank. Each battery unit has contact areas a, b, c and d (in clockwise order starting from top left in FIG. 5A). The tank has two sets of contact surfaces 504A-F, 505A-F. Contact surfaces 505A-F are connected to tank switching logic 508 and contact surfaces 504A-F to tank switching logic 506. The tank switching logics 508 and 506 are connected to main switching logic 510. The switching logics 506, 508 and/or 510 can send commands to battery units to modify the polarity of the contact areas a, b, c or d or to disconnect or short circuit those in arbitrary manner, as described above in connection with the battery units.

To be able to program the battery units, the control unit of the tank needs to discover which battery units are present in the tank and how they are connected with other battery units and the contact surfaces of the tank. In a simplified exemplary process, the discovery can start by configuring all contact surfaces to have resistivity R between them. Then a current I would be fed from one, e.g. the leftmost contact surface 505A of contact surface set 505A-F to contact surfaces 504A-F. Thus, contact surface d of battery unit K is in contact with the contact surface 505A. Based on ohms law the current in battery unit K between contact areas b and d would be largest of all possible contact pairs in the system. Then using a communication protocol, the control unit can request current information from each of the battery units A-M. The battery unit/certain contact area of the unit with largest current and with certain direction of the current (as same current if going through b and d) would be determined to be in contact with contact surface 505A: the same procedure can be used to determine which battery unit/ contact area is connected to contact surface 505B by feeding the current I from contact surface 505B to contact surfaces 504A-F. By connecting contact area d to contact area b of the battery unit K and by feeding current I from contact 505A to contact surfaces 504A-F the biggest current is flowing via contact area d of the battery unit I, and this information can be used to determine which battery unit/contact area is connected to the contact K/b etc. . . . until the relative location of each battery unit would be found, though it is not needed to know all the locations for forming strings.

The battery units can, after discovery, be connected in various different ways to correspond with different needs, e.g. depending upon what is the preferred output voltage or output power. In an example, each battery unit of FIG. 5A has an energy reservoir having the voltage of X volts. One way to form the string is that energy reservoirs are configured so that positive terminals are connected to contact area b for the battery units K, F and A; positive terminals are connected to contact area a for the battery units I and D; negative terminals are connected to contact area c for the battery units K, F and A; negative terminals are connected to contact area d for the battery units I and D. This way battery units K, I, F, D and A form one string between contact surfaces 505B and 504B with five energy reservoirs connected in series. Output voltage of the string would be 5*X volts. This string is shown as a dashed curve in FIG. 5B.

Another string could be formed, e.g. using battery units L, J, G, E, B between contact surfaces 505D and 504D, output voltage of the string would be also 5*X volts. This string is shown as a dash-dot curve in FIG. 5B. Strings could be combined in power combiner to form one output. There is, however, no need that the output voltages of the strings are the same to enable to combine those.

Some of the contact areas of the battery units A-M or contact surfaces 504A-F, 505A-F of the tank can be also in bypass mode in the string if, e.g. energy reservoir is faulty, not all available power is needed, or a long string is to be formed. For example, a longer string can be formed, e.g. by connecting the battery units K, I, G, D and B in series between contact surfaces 505A and 504C, the battery units C, E, H, J and M can be connected in series between contact surfaces 504F and 505E. By further connecting contact surface 504C to contact surface 504F, a string including ten battery units between contact surfaces 505A and 505F can be formed. This string is shown as a solid curve (alternative to other curves) in FIG. 5B.

Figure 5B:
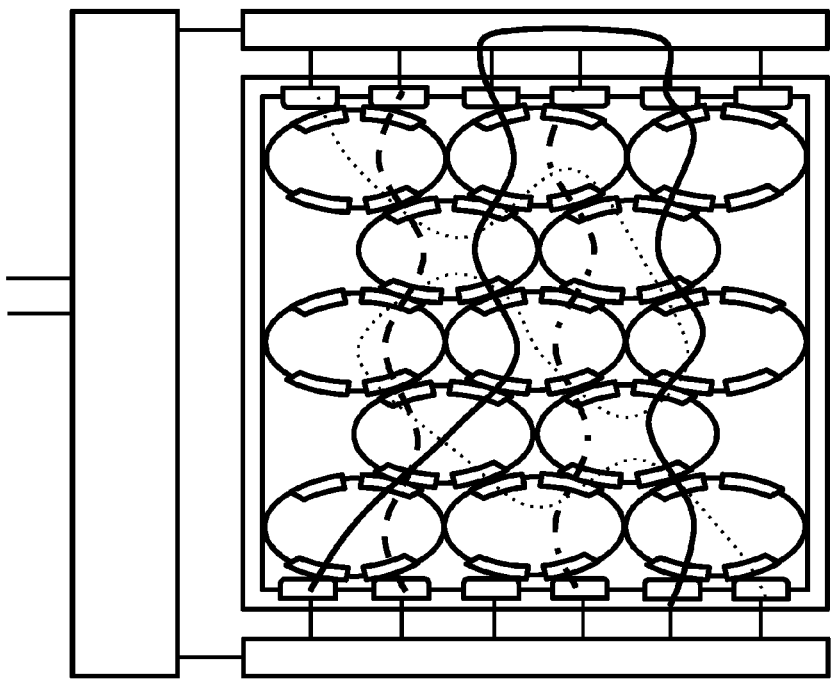

Another exemplary long string between contact surfaces 504A and 505F, employing bypassing in some of the battery units, is shown as dotted curve in FIG. 5B (again alternative to other curves shown). When the curve goes through a battery unit for the first time its energy reservoir is connected in series and when it goes through the same battery units for the next time, the respective contact surfaces are short circuited with each other to achieve a bypass connection. Thus, a continuous energy path is formed.

To be able to individually program each battery unit in a desired way, each unit preferably has unique identifier, as explained above.

Next, preferred properties and operation principles of the tank are described in more detail.

Physical Aspects and Filling (Tank)

The tank comprises a container defining a cavity for containing a plurality of battery units. The size and form of the container can vary broadly. The wall material of the container may be uniform or meshed, as long as the battery units cannot easily escape the container and the wall is sufficient to support the contact surfaces.

Typically, the container comprises an opening, preferably a closeable opening, through which the battery units can be inserted to and removed from the container for filling and emptying the tank. There may also be separate openings for filling and emptying. For example, there may be a removal opening in the bottom of the container and insertion opening on top of the container.

Filling and emptying the tank can be done using various methods, such as gravity, over- or underpressure or gas stream. According to one embodiment, an air pump is used to create an overpressure or partial vacuum capable of moving battery units to or from the tank. In particular, quick emptying of the tank can be done by a partial vacuum which sucks used battery units from the tank away to another container, such as a recharging silo. Emptying purely or partly by gravity is possible too, if there is an opening at the bottom of the tank. Quick refilling can be done for example using a pressure or gas flow transfer along a hose or by pouring the battery units from an opening on the tank. Change of the battery units can be done manually also.

The tank need not be filled completely, provided that at least some of its contact surfaces still come into contact with at least some battery units. There may also be a minimum power requirement. Thus, in practice there is a predefined minimum number of battery units required. The minimum can be for example 10-90%, typically 20-50% of the maximum number of battery units. Thus, the size of the battery pack can be adjusted and optimized for various needs. For example in the case of EVs, a user can fill the tank fully only when there would be need for maximum driving range. On the other hand, if a typical daily driving range is only tens of kilometers, the user does not need the maximum number of the battery units. This makes the EV lighter and more efficient. Certain provisions may be necessary to restrict physical movement of the battery units in the tank. One possibility to achieve this is to fill the empty space of the tank with empty battery units that do not include the power source but might still have full, partial or no intelligence built in.

The filling and emptying system of the tank can be designed to be either open or closed, i.e. allowing gases to enter and exit the battery unit cavity or making it gas-tight, if not hermetically sealable. An open system is simpler than a closed system, but as a drawback, in open system the battery units are exposed to ambient air and possible contaminations. It is preferred that the tank provides environmental protection for the battery units at least against dust, water and other contaminants. It can additionally be designed to be air-tight at least during operation.

For practical reasons, the emptying and/or filling process should be a quick operation, resulting that battery units are moving at relatively high speeds. For this reason, the filling and emptying system should be designed to avoid excessive collisions between the battery units and the tank. When filled, a tank must be able to pack the battery units tightly, generating enough normal force for the most of the connections between the battery units and between the battery units and the tank. This enables to have stable and low resistance electrical contacts. The tank maintains at least most of these normal forces, keeping the battery units stationary within typical working conditions that can include several environmental stresses like thermal cycling, dynamic and static loads, vibration and shocks.

Thus, non-complex shapes such as cylinders, cuboids, spheres, semi-spheres, cones or combinations thereof are preferred shapes of the cavity.

The tank preferably provides good enough cooling to dissipate the heat generated by battery units and electrical contacts between the battery units and the tank. For example for several battery cell chemistries, the preferable operating temperature range can be quite narrow, like −20° C. to +50° C. for typical lithium-ion cells.

Battery unit cooling in the tank can be implemented in several different ways. The maximum random fill ratio of the battery units in a tank is typically around 70%. This means that there is always about 30% void in a tank that can be used to circulate cooling fluid, typically air or cooling liquid. Cooling area per battery capacity is inversely proportional to battery unit size. Because the optimal battery unit size is relatively small, excellent cooling area to battery capacity ratios can be achieved. To avoid tank contamination, internal fluid circulation and heat removal from heat transfer fluid via some type of heat exchanger is preferred. Fluid circulation can be improved by using a pump, fan or blower, depending on the fluid type and construction used. The cooling arrangement is preferably entirely passive, utilizing passive heat transfer through tank walls and gas convection within the tank.

According to one embodiment, there are provided active means, such as a fan, for circulating of flowing gas within the tank and/or in and out of the tank to provide more efficient cooling.

According to one embodiment, there are provided active means for circulating a cooling fluid, such as liquid, in a closed fluid circulation system to provide more efficient cooling.

The fill ratio of the tank can be improved if the tank is agitated after filling. The improvement in fill ratio this way can be several percentages, depending at least on type of the agitation applied, shape of the battery unit and friction of the shell of the battery unit. Also after the agitation there are less loose battery units in the tank that could move during the operation which could cause that some connections between the battery units break which might have effect to the programmed energy paths and there would be a need for rerouting. Agitation can be achieved many ways, for example by vibrating the tank or some parts of it. Another possibility is to use an air pump for agitation by changing the flow direction rapidly several times.

According to one embodiment, the tank comprises integral means for agitating the battery unit container.

According to one embodiment, the tank is capable of providing and maintaining a static overpressure (in relation to the pressure caused by pure gravity) between the battery units. Using such means, after filling and potential agitation and before operation, an additional static pressure can be applied to the tank to increase normal forces between the contact areas of the battery units and between the contact areas of battery units and contact surfaces of the tank. In addition, if the static pressure is large compared with the forces of gravity, the normal forces will be more uniform between different contacts. Applied pressure also improves the ability of the system to withstand vibration and shocks during the operation.

According to one embodiment, the tank comprises one or more mechanical springs capable of causing the static pressure. According to another embodiment, the tank comprises an elastic member, which can be pressed against the battery units after filling. According to a further embodiment, the tank comprises a gas-inflatable member, which can be pressurized with gas after filling the container in order to cause the static pressure.

According to one embodiment, the battery unit container itself is designed to be at least partly elastic or flexible, thus allowing slight "overfilling" of the tank (in relation to its resting volume). Resulting deformation and elastic forces will cause the static pressure between the battery units and tank walls. Elastic design also makes easier applying and maintaining of static pressure easier by external means.

System Elements and Electronics (Tank)

On the inner wall of the container, there are a plurality, i.e. at least two, contact surfaces that are positioned such that at least some of them necessarily come into contact with the battery units. The contact surfaces are used to deliver power form the battery units to an external load, or to the battery units for recharging their energy reservoirs. The total number of contact surfaces is typically at least 4, in particular at least 8, and typically at least 16. The number may be e.g. 16-128. The theoretical maximum number of individual parallel strings, i.e., electrical energy paths through the tank is half of the number of contact surfaces, since the strings typically start from one contact surface and end to another contact surface. The contact surfaces may be divided into two or more groups partly controlled by separate switching logic units.

The contact surfaces are preferably configurable such that each contact surface may be in a disconnected (high-impedance) state or defined as a positive or negative terminal. Optionally, the contact surfaces may be grounded and/or provided with a predefined voltage. There is provided a corresponding switching circuitry, so-called switching matrix, connected to the contact surfaces and connected or connectable to a control unit, also called a tank management unit. The control unit is typically also capable of transmitting programming signals to the battery units through the contact surfaces.

According to one embodiment it is also possible to connect a contact surface to another contact surface using the switching circuitry for forming a low-resistance connection between the contact surfaces. By this arrangement it is possible to have a string which starts for example from one contact surface and after a number of battery units reaches a second contact surface which is internally connected to third contact surface from where the string continues again via battery units until it reaches a fourth contact surface. Thus, the strings need not end once meeting a contact surface but may continue through another contact surface.

According to a preferred embodiment, the contact surfaces are separated into two or more arrays comprising a plurality of contact surfaces each. For example, each array may comprise at least two, preferably at least four individual contact surfaces. The arrays may be placed on different inner walls of the battery unit container. In a typical case the contact surface arrays are placed on opposite sides of the tank, as shown in FIG. 4. Here each contact array includes 16 contact surfaces.

According to one embodiment, the tank comprises a control unit herein called a tank management unit (TMU) and at least two switching matrixes (SMXs) functionally connected to the TMU and to groups of contact surfaces of the tank. In a preferred embodiment, there are also at least two power buses for delivering energy to or from the SMXs and a power combiner for combining the power delivered by the power buses. In addition, there may be user interface means for allowing a user to control the TMU and/or for visualizing the operation and/or charge level of the tank. The tank can also include an extra energy reservoir to supply energy for some time if the supply of power is temporarily interrupted.

The TMU monitors and controls the battery units, the strings, the SMXs and the power buses. The SMXs are used for connecting the strings to the power buses and a communication between the TMU and the battery units happen via the SMX.

The power buses are used to connect several strings to external positive and negative electrical connections.

Figure 8:
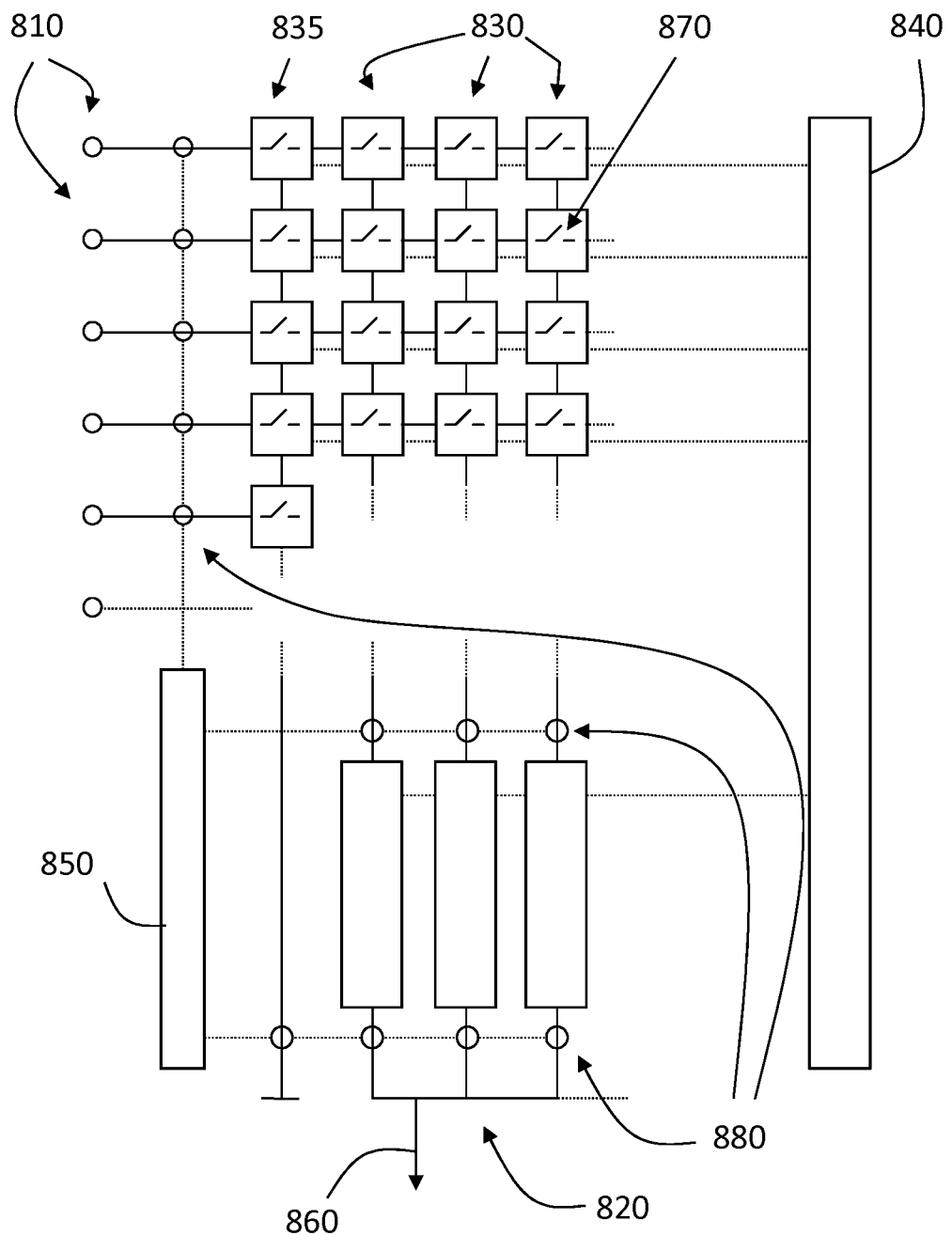
FIGS. 8-10 show block diagrams of an electric tank according to embodiments of the invention.

FIG. 8 illustrates one potential SMX architecture. The contact surfaces 810, power buses 830 and a ground bus 835 are connected in a matrix where each contact surface 810 can be connected to any of the power buses 830 or the ground using connecting elements 870. The matrix is controlled by a switch matrix controller 840, which may be a separate unit or the main control unit of the tank. In addition, there is a power combiner block 820 and current and/or voltage measurement components 880 connected to each power bus 830 and contact surface 810. The measurements are controlled by a measurement and communication unit 850. The measurement information can be delivered to the switch matrix controller 840. Unified voltage is provided at output 860.

The switch matrix controller 840 preferably comprises switching circuitry, a CPU, transmission circuitry, receiving circuitry, monitoring circuitry, and the described interfaces towards the power buses, the contact surfaces and the TMU. In addition to connecting the contact surfaces to a power bus or ground, the SMX can preferably set the contact surfaces to a high impedance state or connect them to a certain voltage.

Figure 9:
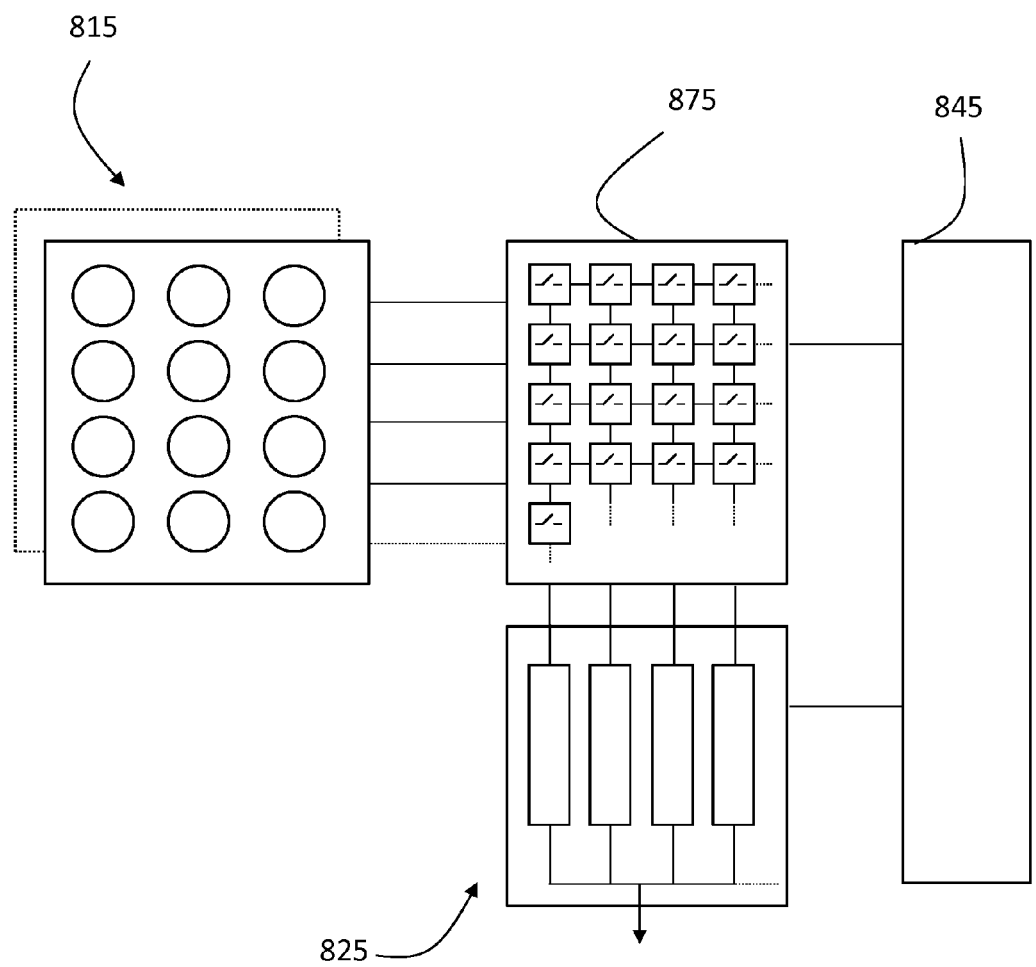

FIG. 9 illustrates the system in more general level. The contact surfaces are denoted with reference numeral 815 and are connected to the switching matrix 875. It can be seen that the power buses from the switching matrix 875 are connected to a power combiner 825. The power combiner 825 is needed to combines the supply from several power buses into a single tank output terminal pair for a load, such as a BEV. The power combiner 825 is preferably capable of combining strings with different voltage levels to a single tank output terminal pair. There may also be several power combiners if several tank outputs, e.g. with different output voltages, are needed. The TMU, which typically provides most computational power for the tank system, is denoted 845 in FIG. 9.

The TMU contains necessary software means for performing the required business logic operations such as running routing algorithms and potential safety checks, system metrics, etc. There are also software means for translating the computational results of the business logic operations into messages and vice versa according to a messaging protocol used. These messages contain instructions for other parts of the system such as the SMX or the battery units. There is also a hardware interface providing a link between the software means of the TMU and the other parts of the system. This layer controls the hardware of the tank.

According to one embodiment, the transmitting circuitry of the SMX enables the communication between the TMU and the battery units. The SMX forwards messages meant for the battery units coming from the TMU to the battery units. The messages can be sent via a certain contact surface or it can be broadcasted over several contact surfaces at the same time. The TMU decides on the contact surfaces used for the communication.

According to one embodiment, the receiving circuitry receives messages coming from the battery units and the SMX forwards those messages to the TMU. The messages can be received using several contact surfaces at the same time or using one specific contact surface again decided by the TMU.

According to one embodiment, the monitoring part of the SMX enables measuring the current and the voltage of the power buses, measuring the current and voltage of the contact surfaces. Also monitoring of the temperature of the SMX is possible.

Figure 10:
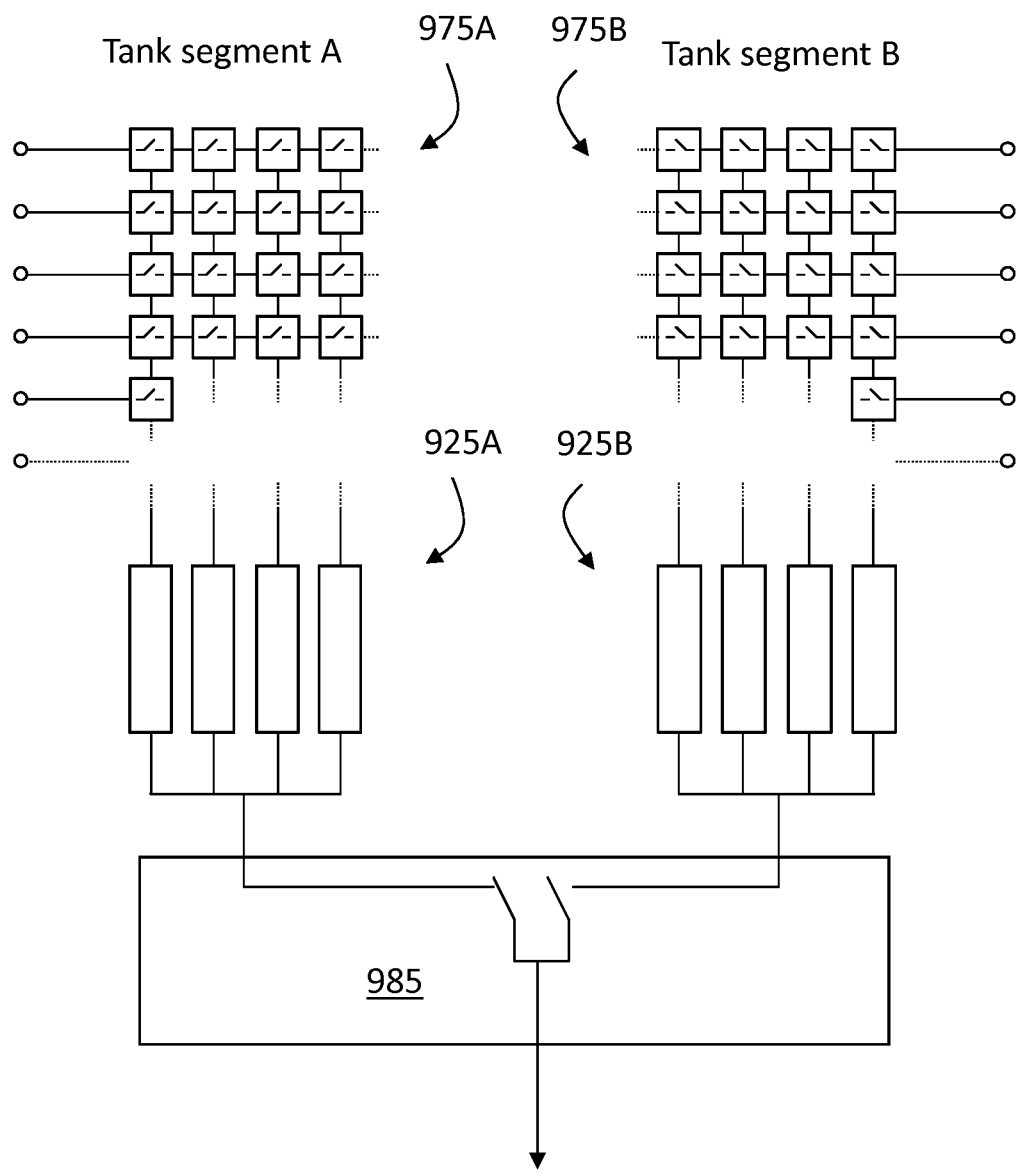

Finally, FIG. 10 shows a continuity enabler arrangement according to a preferred embodiment of the tank. There are two tank segments A and B, each like illustrated in FIG. 8, with separate switching matrixes 975A, 975B and power combiners 925A, 925B, typically connected to different battery unit strings. The segments are connected to tank segmentation logic 985 between the segments and the load. The purpose of the tank segmentation logic is to ensure that while one segment of the tank is communicating, re-routing or otherwise unavailable for power delivery, another segment can take over the power delivery function without interrupting power delivery to load. There may be also an additional buffer energy reservoir connected to the tank segmentation logic for ensuring power delivery during short periods of unavailability of the segments, for example if all battery units are engaged in a communication or synchronization sequence.

Overall Operation Process (Tank)

Figure 11A:
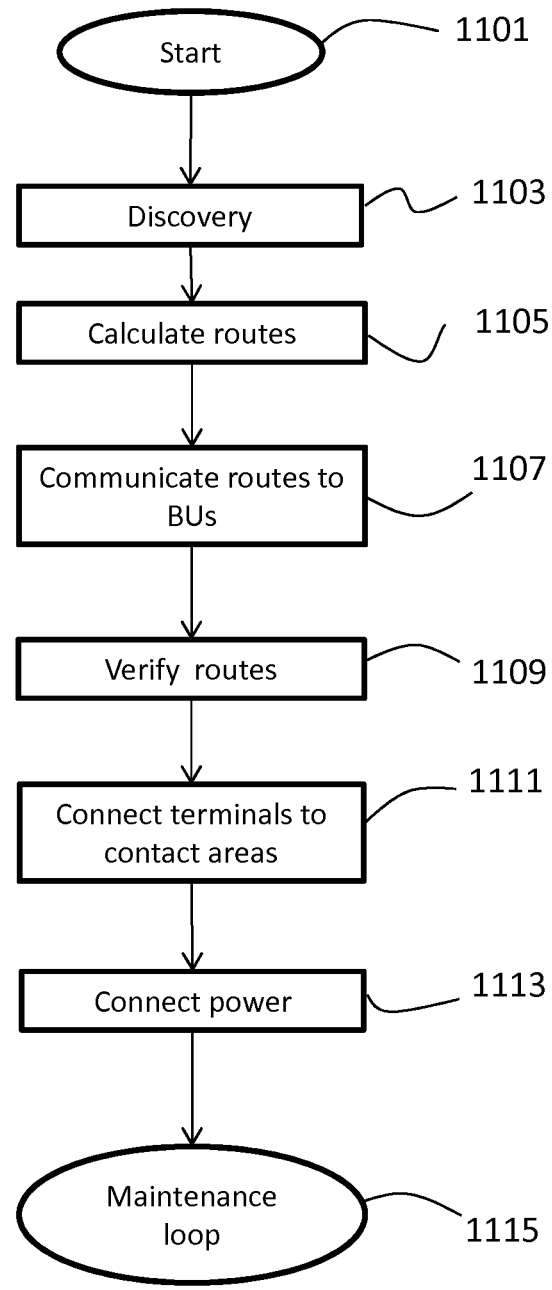
FIGS. 11A and 11B contain flow charts illustrating operation of the electric tank according to embodiments of the invention.
Figure 11B:
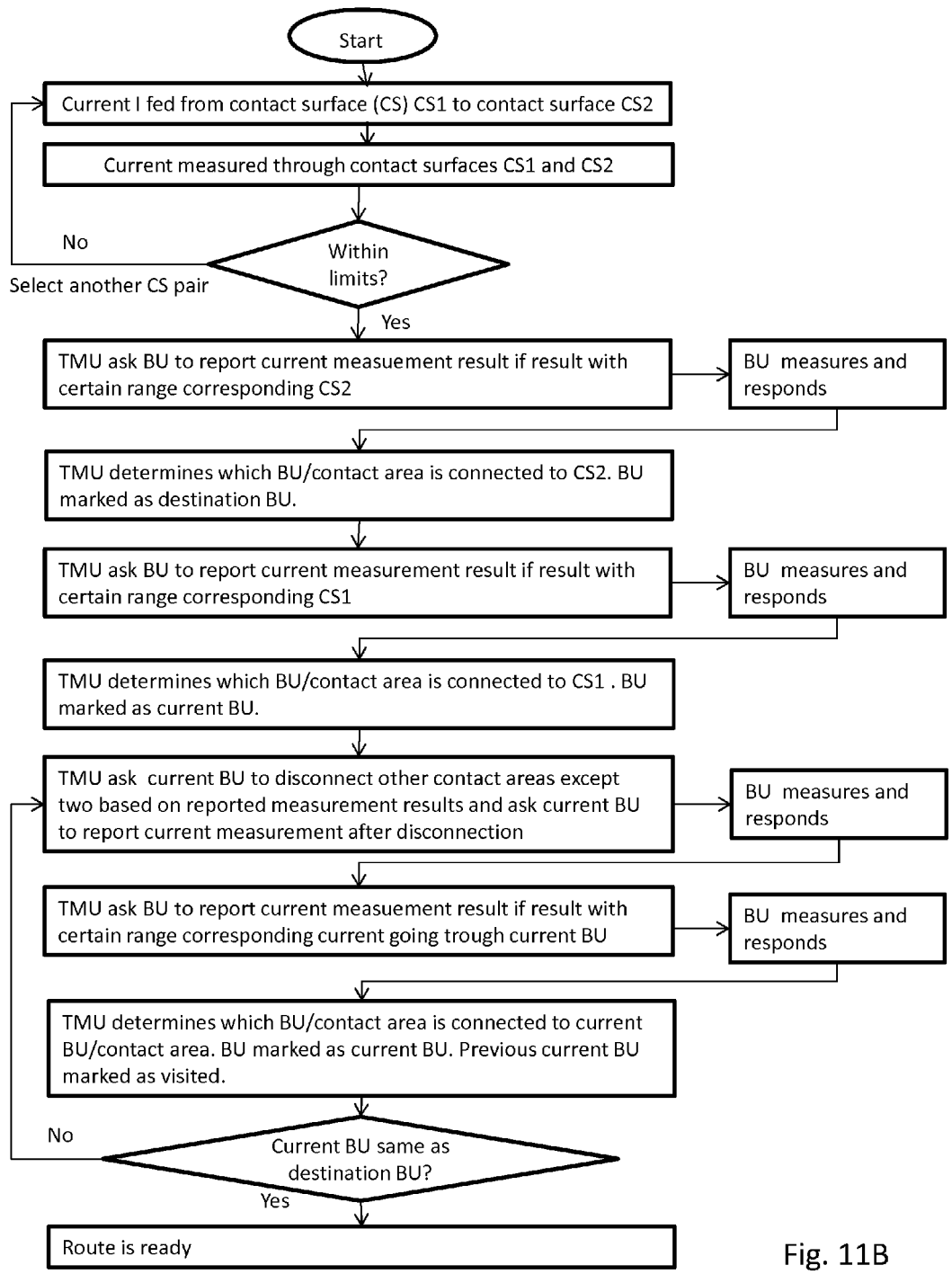

FIG. 11 A illustrates an example of a tank operation process from a start 1101, where the tank is filled with battery units but not yet delivering power, to maintenance of the tank in a power delivery state 1115. First, the TMU starts the discovery process 1103 FIG. 11B, and discussed below more detail, to find available strings in the tank. TMU stores the information received from the battery units. The discovery process as pictured in FIG. 11B describes how a string can be identified and constructed. In case there are several contact surfaces available, the same process can be repeated several times with different contact surface pairs if several strings are formed. The discovery process collects or constructs information on how the route can be establish between two contact surfaces. Based on this information, the calculate route process 1105 determines how the terminals of the energy reservoirs are connected to the contact areas of the battery units so that those are connected in series.

In step 1107, the TMU communicates to the battery units which contact area terminals of the energy reservoirs are to be connected. The battery units store this information. Before connecting the terminals, the established strings are verified in step 1109. Exemplified verification can be done by connecting contact areas determined in the previous step in bypass mode. Then current is fed from the different contact surfaces. By measuring if the current is within certain range, the TMU can determine that there is route available between two contact surfaces. The battery units monitor also the currents during the operation and if it exceeds the threshold terminals are disconnected from the contact areas.

After verification step 1109 the TMU commands the battery unit to connect terminals of the energy reservoirs to the contact areas 1111. Once this has been done, the power buses and power combiner(s) can be powered up in step 1113 to provide an output voltage from the tank to a load. The TMU commands in this step to which power bus certain contact surfaces is connected and it measures the power bus voltages which should correspond to earlier calculated values. Calculated voltages can be computed within certain limits of precision, as TMU knows which battery units are part of a particular string, and the battery units report the voltage of the energy reservoir during the discovery process. The system in operation is maintained in a maintenance loop in step 1115, where the power buses and strings are repeatedly monitored in order to be able to react to essential changes in the tank.

Discovery and Routing (Tank)

After the tank is filled with battery units and a communication link established with the battery units, the tank starts a process to find out what kind of connections there are available between the battery units and between the tank and the battery units. This process is called the discovery process.

According to one embodiment, in addition to finding the available connections, the discovery process includes collecting other information stored in or measurable from the battery units. This information can be e.g. voltages of the energy reservoirs, charge levels of the energy reservoirs, the temperature of battery units and the number of charging cycles. The information collected is stored in the control unit.

It should be noted that there is no need to have all the contact information available for all the battery units in a tank to operate. It is sufficient that one string can be established to allow the tank to deliver power. Few long strings with higher output voltages enable in principle smaller power losses, compared to many shorter strings with a lower output voltage. The disadvantage of long strings and the high voltages associated with it, are higher voltage tolerance levels required for the parts. It increases the possibility that the voltage difference between two neighboring battery units goes over the used semiconductors specified breakdown voltage. Many shorter strings require more power buses and thus more components needed in the switching circuitry and the power combiner to manage all the strings.

With reference to FIGS. 6A-6D, according to one embodiment, discovery is carried out when the battery units form a resistor network. The contact areas of each single battery unit are arranged in a virtual star configuration. In a star configuration, illustrated in more detail earlier with reference to FIG. 2B, one terminal of a resistor is connected to each contact area of the battery unit and the other terminal of the resistor is connected to common star point of the battery unit (FIGS. 6A-6D do not show individual resistors inside the battery units but a general switching logic between the contact areas). This means that their contact areas are connected to each other such that each battery unit has a known internal resistance between each pair of its contact areas. Some of the contact areas of the battery units in the network are in contact with contact surfaces 604*a-d*, 605*a-d* of the tank, some in contact with contact surfaces of other battery units and some remain unconnected.

Figure 6A:
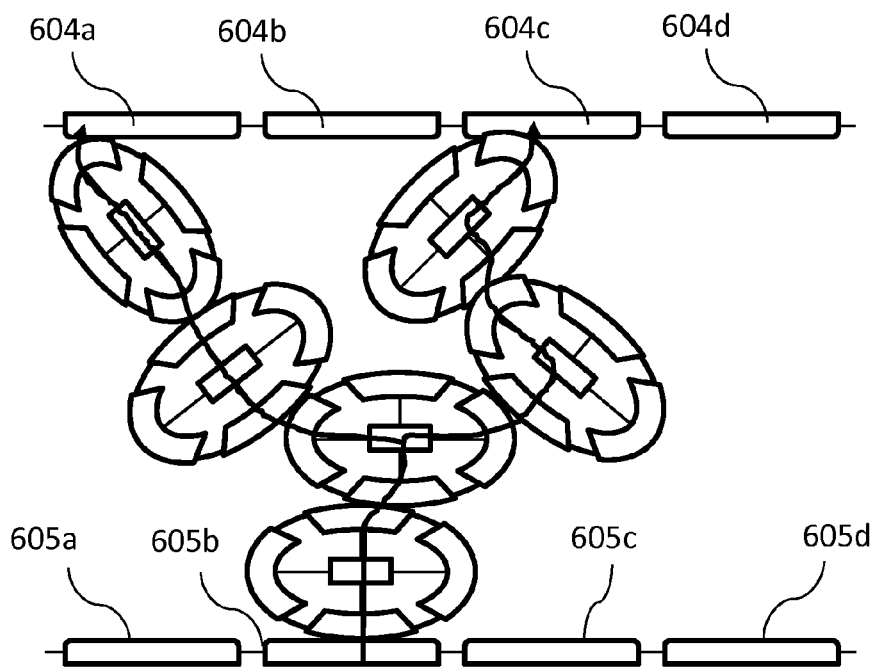
FIGS. 6A-6D represent randomly packed electric tanks in two-dimensional cross-sectional views to illustrate battery unit discovery process.
Figure 6B:
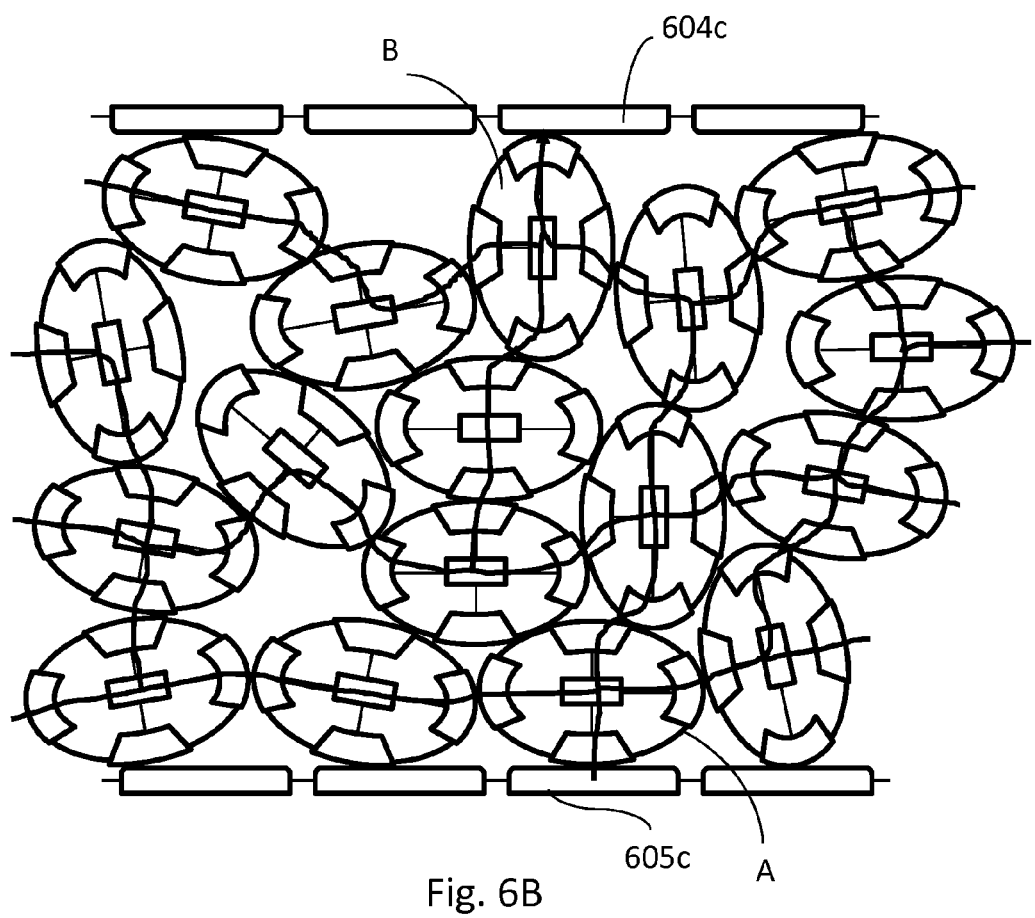
Figure 6C:
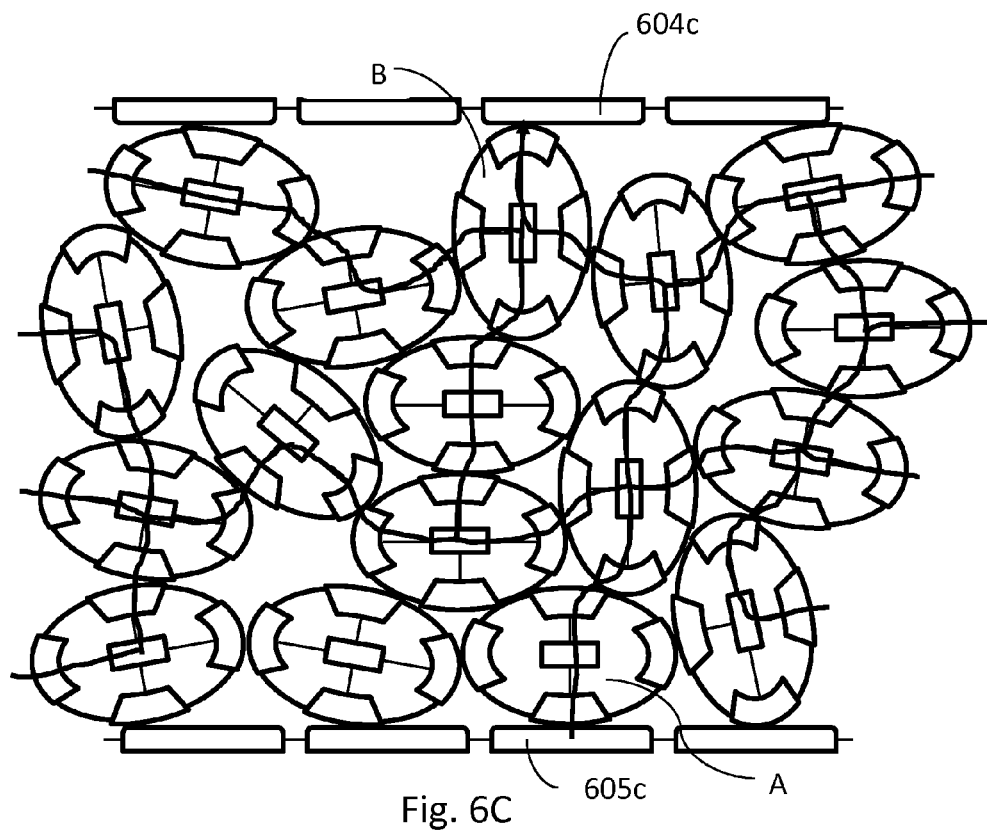
Figure 6D:
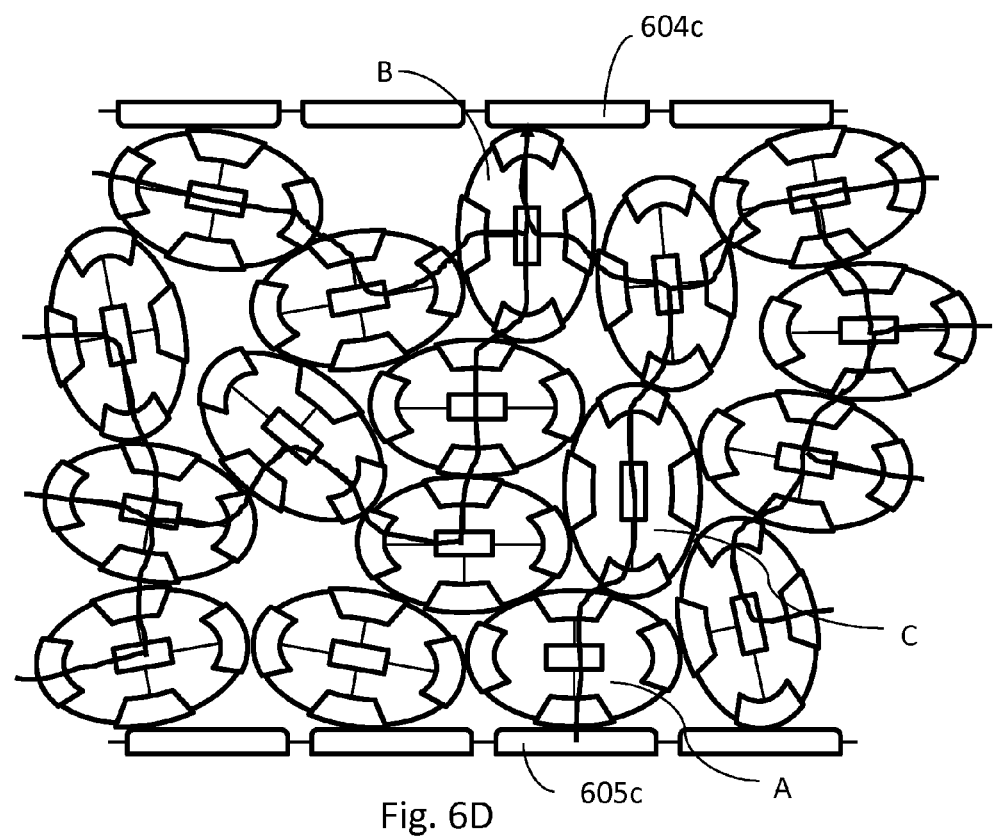

With additional reference to FIG. 11B, the discovery starts by connecting a predefined voltage to a first contact surface (CS1 in FIG. 11B), connecting a second contact surface (CS2 in FIG. 11B) to the ground, and setting other contact surfaces into a high impedance state. Then, by measuring the current which is flowing via the first contact surface, the tank can determine if there a string available between these two contact surfaces because the battery units form a big resistor network. If there is no current flowing, the TMU connects a voltage to another contact surface or another contact surface to ground and repeats the current measurement and conclusion on string availability. For example in FIG. 6A there are strings available between contact surfaces 605*b*/604*a*, 605*b*/604*c* and 604*a*/604*c*. If the control unit does not get expected answer from any of the battery units in some phase of the process it can use other contact areas of the current battery unit for finding a string or the control can start the new process by connecting a voltage to another contact surface or another contact surface to ground (not shown in the figure). FIGS. 6B-6D illustrate a more complex situation. FIG. 6B shows an exemplary battery unit network with all available current paths between contact surfaces 605*c* and 604*c* drawn (assuming also that the network continues to left and right). FIGS. 6C and 6D illustrate a situation where some strings have been visually eliminated to illustrate the following procedure.

To gain more exact information on the strings, the TMU commands that each battery unit measures the current flowing through all of its contact areas. The TMU can also command that a battery unit will answer only if the measurement result is within certain range. For example, the TMU can set the range so that it corresponds to current flowing through a specific contact surface (say, contact surface 605*c* in FIGS. 6B-6D). This is done to minimize the messages sent between the battery units and the TMU.

According to one embodiment, each battery unit has a unique identification number which the battery unit reports when answering to the TMU. Based on the measurement results, the TMU can decide which contact area of the certain battery unit is connected to a specific contact surface of the contact plate. This can be deduced because the current flowing via each resistor in the network is the same as current flowing through the contact surface corresponding to that resistor. The current is also the largest through the contact areas which are in touch with contact surfaces of the tank. In a typical case each battery unit has several connections, and the current is divided between multiple resistors connected to contact areas to several paths over the resistor network.

The nominal value of the current flowing through the resistor connected to contact surface which is connected to the ground is the same as flowing through resistor connected to the voltage, because all the divided current flows are combined to one current flowing to the ground. Based on this, the TMU can deduce which contact area of a certain battery unit is connected to the contact surface connected to ground and therefore to unambiguously find the end points of the string.

The discovery process continues by disconnecting the other contact areas except two for the two battery units A in contact with contact surfaces 605*c* discovered in the previous step (see FIG. 6C). The shortest route between these contact areas can be found out by using the contact areas via which the largest current flows. The largest current route is known based on reported current measurements for each contact areas which battery units report to the TMU. After disconnecting the other contact areas for battery unit A, the TMU asks the current measurement report from the battery unit A to find out what is the current flowing through it. Then the TMU commands that each battery unit measures the current flowing through all of its contact areas and the battery unit will answer only if the measurement corresponds to the current flowing via battery A. Based on this information, the TMU can deduce which contact area of a certain battery unit is connected to the contact surface of the battery unit A. In such case, when a connection is not found, the TMU can use another contact area to try to identify a string. Such measurement can be repeated for all contact areas of the battery unit A to find out all the available connections. This is not necessary for determining the strings but might be useful for optimizing the strings in some applications.

The whole string is determined by repeating the steps described above until the whole string is known, e.g the next step starts by disconnecting the other contact areas except two for the battery unit C (see FIG. 6D). The TMU stores the information about the possible connections and what was the route used for each battery unit. For longer strings it is possible to use bypassing for the already known route so that the measured current is bigger. This means that the battery units along the known route are programmed to bypass mode between the contact areas on the route, whereby their star resistors do not dissipate power and increase the current flowing through the route which increases the probability for successful detection of the signal.

After the first string has been determined, the same process is repeated for other potential contact surface pairs of the tank, i.e. a known discovery voltage is connected between some other contact surface pair and all other contact surfaces are set to a high impedance state.

The TMU knows which battery units are already in use in another string and, according to one embodiment, it takes this into account when forming the new strings to save time and energy. The battery units already determined to be used in a previously constructed string, are programmed to disconnect contact areas needed for those strings, so that when connecting the discovery voltage and ground to some other contact surfaces, it is immediately known by measuring the current if a string can be formed between these two contact surfaces.

According to one embodiment, the process described above is repeated until there are several strings available. The process can be done from several contact surfaces at the same time to minimize the time needed for the discovery, at least for a large tank.

It should be noted that the described discovery process is exemplary only and can be implemented in many other ways utilizing current flow measurements in the resistor network, or in some completely different way.

Based on the discovery process, the control unit of the tank decides on the tank configuration, i.e., how many parallel strings there are, how many energy reservoirs are included in each string, which contact surfaces of the tank are used as string end points and how the strings are formed, i.e., how each individual battery unit is to be configured. This process is called the routing process.

Based on routing, the tank control unit finally configures the tank, i.e., communicates to individual battery units how the positive and negative terminals of their energy reservoirs are connected to the contact areas of the battery units so that the energy reservoirs of different units are connected in series, and potential bypass connections as well, to form the strings.

Bypassing may enable better usage of the battery units, for example when there is a battery unit whose charge level is too low to be used for delivering power. By bypassing, it can still assist in establishing a string. Bypassing also enables that the battery unit delivering power can be used for another string in bypass mode, using other free contact areas, which are not used for connecting the energy reservoir. Thus, a single battery unit may simultaneously deliver power and bypass current through different pairs of contact areas. Bypassing can be also used for decreasing the temperature of the battery unit if it is over a predefined threshold value by connecting the battery unit to bypass mode for some time or using some duty cycle for power delivery.

The TMU preferably communicates the routing information to the battery units via the SMXs. The TMU also ensures that each battery unit acknowledges that it has received the appropriate connection commands and, if needed, the TMU can re-transmit the information. Each battery unit preferably stores its own configuration information in its own local memory.

The tank may also provide an interface to connect an external user interface for monitoring the charge level of the tank or each battery unit separately or in a statistical presentation. In a similar way, the tank can provide also other detailed information of the characteristics of the battery units and the strings.

Verification and Safety (Tank)

According to one embodiment, before the power is connected from or to a tank, each string is verified. In the verification process, it is for example checked that there are no direct connections to other strings, which might cause short circuits. The string voltage is also verified. The voltage should correspond to a calculated voltage based on the discovery/routing information and reported energy reservoir voltages from the battery units. The battery units namely report their energy reservoir voltages during the discovery/routing processes and this information is stored to the TMU. Before connecting energy reservoirs to the contact areas, the strings are also internally verified to be logically correct and free of short circuits. This is done for example by connecting the route for each string in the bypass mode and connecting a voltage between the ends of the string. The following step is measuring the current flowing through the string, and with a comparative algorithm, it can be determined with a high degree of confidence that the strings were formed correctly.

The TMU configures the SMXs to define which string is connected to which power bus, i.e., which contact area of the contact plate needs to be connected to which power bus and which contact area is connected to ground. After the strings are connected to the power buses, the TMU requests power bus reports from the SMXs. The SMXs report the measured voltages and the TMU compares those to a corresponding calculated value.

After string verification completes, the TMU configures all battery units in order to route the internal energy reservoirs to the appropriate contact areas according to the verified strings. Accordingly the power combining is enabled only after verifying corresponding strings whose powers are to be combined.

The tank may include also other important safety functions to prevent over-charging, over-discharging and the shorting of terminals.

Monitoring and Maintenance (Tank)

According to one embodiment, the tank is provided with means for periodically monitoring electrical characteristics of the strings and the battery units during operation of the tank. Should the monitoring require active participation of the battery units, the battery units are correspondingly provided with means for reporting to the tank using suitable communication means. The electrical characteristics may include charge and discharge current, temperature, number of cycles and voltage or charge level of energy reservoirs. If needed, i.e., if predefined threshold values or threshold criteria for the monitored values or values derived from them are exceeded, the tank can reconfigure the strings based on the monitoring information. For example if a battery unit is depleted during operation, the system can take that into account. Reconfiguration may be preceded by a rediscovery or rerouting process. Reconfiguration may take place during normal operation of the tank.

One potential reason for reorganization is that the charge level of certain battery unit goes beyond a predetermined state of charge window. A typical decision would be that such unit can at least temporarily no longer be used for delivering power.

Another examples where reorganization is needed is when the TMU notices that the current of a string is not in line with algorithmic predictions. This could happen if a connection between some battery units have been disconnected during operation and the string is not supplying any power. In such cases, rerouting is done in the TMU and it uses available contact information. If some contacts have been disconnected, then the discovery can be done again during the operation.

Power Combining (Tank)

As briefly explained above, according to one embodiment, the tank includes a power combiner, which combines the strings with different number of the battery units and with different string voltage levels together. The output of the power combiner comprises at least one negative and one positive terminal, for supplying energy from the tank to a load to be possible.

The output voltage of the strings varies since the state of charge, health, age, capacity, battery chemistry, internal resistance, thermal constraints, maximum allowed power dissipation numbers (among many other parameters) of the battery units vary. As a result, the total string output voltage varies.

Before combining the strings from several parallel strings, output voltage of at least one string needs to be adapted to allow load sharing. For supplying a load, a bus voltage within relatively narrow margins is usually required. A switched mode power supply (SMPS) is used to convert the variable string voltage to the needed bus voltage, of which the exact value depends on the use case.

Different voltage converter circuit topologies can be used for SMPS like buck, boost and buck-boost. The chosen converter topology is driven by the use case. Sharing of loads can be done with various methods, e.g. the system can vary the output voltage of each string through one SMPS per string until the desired current draw level on all paths is obtained.

Charging System (Tank)

According to one embodiment, the tank provides a charging system which can be used for the charging battery units from plug in without removing the battery units from the tank. The tank preferably provides necessary means to provide a needed power for charging one or several strings at the same time, and for monitoring the battery units during the charging to maximize the useful life of the battery units. The tank may also comprise means for adjusting the charging voltage during charging to maximize the life of the battery units.

The tank may include an AC/DC converter to convert typical AC mains voltage to the needed DC voltage to supply the battery units. The tank connects the needed power for the strings via the contact surfaces of the tank. For charging, the tank can use information for the existing strings or it can form the new strings. The tank monitors the charge level and temperature of the battery units to stop the charging when needed. If some battery unit reaches the full charge level it can be bypassed and the charging of the rest of the battery units connected in series can still continue. On the other hand, if the temperature of some unit goes over a predefined threshold limit, it can be bypassed for some time and then continue charging.

Finally, the tank or any other part of the system may provide an interface to charging infrastructure, such as defined by the SAE J1772 or IEC 62196 standards; in addition to an interface to on-vehicle local area networks, typically based on the CAN or LIN standards.

The invention claimed is:

1. An electric energy storage and supply system comprising:
    a plurality of battery units where each battery unit comprises an electric energy reservoir having positive and negative voltage supply terminals, three or more electric contact pads on an outer surface of the battery unit, and a dynamically configurable connection unit for electrically connecting each of said positive and negative voltage supply terminals to any one or more of said electric contact pads, wherein electric energy can be drawn from the electric energy reservoir via selectively different combinations of electric contact pads; a tank capable of accommodating the plurality of battery units;
    at least two inwardly facing tank contact pads provided on the inside of the tank for contacting electric contact pads of neighboring battery units and for delivering electrical energy from the system towards an external load;
    a tank loader for loading the battery units into the tank such that electrical contact pads of adjacent battery units are or have a high probability of being in contact and the orientation and location of individual battery units within the tank is unknown a priori; and
    a tank unloader for unloading the battery units from the tank.

2. The electric energy storage and supply system according to claim 1, wherein one or both of the tank loader and tank unloader are pressure and/or gas flow aided.

3. The electric energy storage and supply system according to claim 1 and comprising a pressurizing unit for applying pressure to the loaded tank in order to immobilize the loaded battery units.

4. The electric energy storage and supply system according to claim 1 and comprising a charging controller for recharging the loaded battery units.

5. The electric energy storage and supply system according to claim 1 and comprising a cooling unit for cooling the loaded battery units by circulating a cooling fluid within the loaded tank.

6. The electric energy storage and supply system according to claim 1 and comprising an agitation unit for agitating the tank in order to increase the packing density and or stability of the loaded battery units.

7. The electric energy storage and supply system according to claim 1 and comprising a controller for identifying one or more available and or optimal electrical energy supply paths between the or at least two tank contact pads via the battery units and for programming individual battery units to supply electrical energy via these paths.

8. The electric energy storage and supply system according to claim 7, said controller having an interface for receiving information on the state of battery units in the tank and being configured to use said information to identify said optimal electrical energy supply paths.

9. The electric energy storage and supply system according to claim 8, wherein said interface communicates with the battery units via said tank contact pads and the electric contact pads of the battery units.

10. The electric energy storage and supply system according to claim 8, wherein said controller is configured to receive, via said interface, machine-readable identification codes transmitted by battery units in the tank, and to use said codes as addresses for transmitting programming instructions to the battery units.

11. The electric energy storage and supply system according to claim 7, wherein said controller is configured to dynamically repeat said steps of identifying and programming in order to maintain optimal electrical energy supply paths.

12. The electric energy storage and supply system according to claim 7, wherein the controller is configured to identify a plurality of optimal electrical energy supply paths such that each path passes through a different subset of battery units.

13. The electric energy storage and supply system according to claim 7, said tank comprising three or more inwardly facing tank contact pads and said controller being configured to identify optimal electrical energy supply paths taking into account different available combinations of tank contact pads.

14. The electric energy storage and supply system according to claim 1 and comprising a power combiner for selecting and or combining electric energy available from multiple different available and or optimal electrical energy supply paths.

15. The electric energy storage and supply system according to claim 13, said tank contact pads being arranged as one or more arrays of tank contact pads.

16. The electric energy storage and supply system according to claim 1, wherein said tank loader is configured to assist pumping of battery units into the tank.

17. An electrically powered vehicle comprising the electric energy storage and supply system according to claim 1.

* * * * *